(12) United States Patent
Manning et al.

(10) Patent No.: US 11,781,096 B2
(45) Date of Patent: Oct. 10, 2023

(54) ENZYMATIC DEGRADATION OF MYCOTOXINS DURING GRAIN PROCESSING

(71) Applicant: POET Research, Inc., Sioux Falls, SD (US)

(72) Inventors: Andrew J. Manning, Sioux Falls, SD (US); Steven T. Bly, Sioux Falls, SD (US)

(73) Assignee: POET Research, Inc., Sioux Falls, SD (US)

( * ) Notice: Subject to any disclaimer, the term of this patent is extended or adjusted under 35 U.S.C. 154(b) by 0 days.

(21) Appl. No.: 18/054,641

(22) Filed: Nov. 11, 2022

(65) Prior Publication Data

US 2023/0084238 A1 Mar. 16, 2023

Related U.S. Application Data

(63) Continuation of application No. 17/199,274, filed on Mar. 11, 2021.

(60) Provisional application No. 62/988,670, filed on Mar. 12, 2020.

(51) Int. Cl.
| | | |
|---|---|---|
| *C12C 11/00* | (2006.01) | |
| *C12C 5/00* | (2006.01) | |
| *A23K 10/14* | (2016.01) | |
| *A23K 10/12* | (2016.01) | |

(52) U.S. Cl.
CPC .............. *C12C 5/004* (2013.01); *A23K 10/12* (2016.05); *A23K 10/14* (2016.05); *C12C 11/00* (2013.01)

(58) Field of Classification Search
CPC ........ A23K 10/12; A23K 10/14; C12C 5/004; C12C 11/00

USPC .......................................................... 426/13
See application file for complete search history.

(56) References Cited

U.S. PATENT DOCUMENTS

| | | |
|---|---|---|
| 7,297,236 B1 | 11/2007 | Vander Griend |
| 8,703,460 B2 | 4/2014 | Moll et al. |
| 9,901,108 B2 | 2/2018 | Mann |
| 9,902,830 B2 | 2/2018 | Yiannikouris |
| 10,131,866 B2 | 11/2018 | Elend |
| 10,149,489 B2 | 12/2018 | Fruhauf |

(Continued)

FOREIGN PATENT DOCUMENTS

| | | |
|---|---|---|
| CN | 102827881 | 11/2013 |
| EP | 3157538 B1 | 5/2019 |

(Continued)

OTHER PUBLICATIONS

CN-102827881-Machine Translation (Year: 2013).*

(Continued)

*Primary Examiner* — Hamid R Badr
(74) *Attorney, Agent, or Firm* — FisherBroyles, LLP; Cara L. Crowley-Weber; Cary Reeves

(57) ABSTRACT

Methods, compositions, and systems for steeping, propagation and fermentation, particularly large-scale operations for production of starch and ethanol and fermentation product streams are provided. Addition of mycotoxin mitigating enzymes or microorganisms expressing mycotoxin mitigating enzymes to steeping, propagation, and/or fermentation tanks, and/or to post-fermentation product streams, mitigates mycotoxin levels in fermentation co-products obtained from mycotoxin contaminated feedstocks.

15 Claims, 5 Drawing Sheets

Specification includes a Sequence Listing.

| Source of Enzymatic System | % of Control Final Ethanol Titer | % DON Mitigated by System |
|---|---|---|
| Average Control | 100% | 0 |
| Average *P. pastoris* Lysate | 99.6% | 94% |
| Average *P. pastoris* Purified Enzyme | 100% | 94% |
| Average *S. cerevisiae* Lysate | 100.4% | 99% |
| Average *S. cerevisiae* Purified Enzyme | 100.5% | 99% |
| Average *E. coli* Lysate | 100.3% | 96% |
| Average *E. coli* Purified Enzyme | 99.6% | 93% |

(56) References Cited

U.S. PATENT DOCUMENTS

| | | |
|---|---|---|
| 10,450,271 B2 | 10/2019 | Trail |
| 10,531,662 B2 | 1/2020 | Strasburg |
| 10,598,661 B2 | 3/2020 | Sarver, Jr. |
| 10,721,950 B2 | 7/2020 | Cecava |
| 11,136,561 B2 | 10/2021 | Acosta |
| 2015/0376558 A1 | 12/2015 | Elend et al. |
| 2018/0080011 A1 | 3/2018 | Binder et al. |
| 2018/0092950 A1 | 4/2018 | Davis |
| 2018/0279616 A1 | 10/2018 | Dahmen |
| 2018/0325936 A1 | 11/2018 | Marquardt |
| 2019/0029296 A1 | 1/2019 | Urban |
| 2019/0293527 A1 | 9/2019 | Jabour |
| 2020/0029575 A1 | 1/2020 | Trail |
| 2020/0040312 A1* | 2/2020 | Hoff .................. C12N 9/0008 |
| 2020/0236965 A1 | 7/2020 | Bianchini |
| 2020/0308613 A1 | 10/2020 | Louie |
| 2022/0298521 A1 | 9/2022 | Siller et al. |

FOREIGN PATENT DOCUMENTS

| | | |
|---|---|---|
| EP | 2677881 B1 | 4/2020 |
| EP | 3215609 B1 | 4/2020 |
| WO | WO 2011100165 | 8/2011 |
| WO | WO 2013086548 | 6/2013 |
| WO | WO 2016070206 | 5/2016 |
| WO | WO 2017044624 | 3/2017 |
| WO | WO 2018113743 | 6/2018 |
| WO | WO 2019034567 | 2/2019 |
| WO | WO 2019046954 | 3/2019 |
| WO | WO 2019162362 | 8/2019 |
| WO | WO 2020025580 | 2/2020 |
| WO | WO 2020047656 | 3/2020 |
| WO | WO 2020178184 | 9/2020 |

OTHER PUBLICATIONS

Ito, M. et al. Appl. Environ. Microbiol. 79: 1619-1628 (Year: 2013).*

Carere et al. Microb. Biotech. 11: 1106-1111 (Year: 2018).*

Carere (2018) "The enzymatic detoxification of the mycotoxin deoxynivalenol: identification of DepA from the DON epimerization pathway" Microbial Technology 11(6):1106-1111.

Carere (2018) "The identification of DepB: an enzyme responsible for the final detoxification step in the deoxynivalenol epimerization pathway in Devosia mutans 17-2-E-8" Frontiers in Microbiology 9(1573):1-9.

Hassan et al. (2017) "The enzymatic epimerization of deoxynivalenol by Devosia mutans proceeds through the formation of 3-keto-DON intermediate" Scientific Reports 7:6929.

He et al. (2010) "Chemical and biological transformations for detoxification of trichothecene mycotoxins in human and animal food chains: a review" Trends in Food Science & Technology 21:67-76.

International Search Report from PCT/US2021/049589 dated Jul. 7, 2022.

Ito et al. (2013) "Bacterial cytochrome P450 system catabolizing the fusarium toxin deoxynivalenol" Applied and Environmental Microbiology 79(5):1619-1628.

Juodeikiene et al. (2009) "Reduction of deoxynivalenol (DON) using xylanolytic enzymes during alcoholic fermentation of fusarium contaminated wheat" Original Scientific Paper 13(2):107-110.

Karlovsky (2011) "Biological detoxification of the mycotoxin deoxynivalenol and its use in genetically engineered crops and feed additives" Appl Microbiol Biotechnol. 91:491-504.

Khatibi et al. (2011) "Conversion of deoxynivalenol to 3-acetyldeoxynivalenol in barley-derived fuel ethanol co-products with yeast expressing trichothecene 3-O-acetyltransferases" Biotech for Biofuels 4(26):1-13.

Loi et al. (2017) "Mycotoxin Biotransformation by Native and Commercial Enzymes: Present and Future Perspectives" Toxins 9:111 (31 pages).

Moerck et al. (1980) "Aflatoxin Destruction in Corn Using Sodium Bisulfite, Sodium Hydroxide and Aqueous Ammonia" Journal of Food Protection 43(7):571-574.

Pinton et al. (2012) "Toxicity of Deoxynivalenol and Its Acetylated Derivatives on the Intestine: Differential Effects on Morphology, Barrier Function, Tight Junction Proteins, and Mitogen-Activated Protein Kinases" Toxicology Sciences 130(1):180-190.

Roembke (2019) "Climate change and animal feed: mycotoxin risk mitigation" Feed Strategy November Edition pp. 4-7.

Young et al. (1986) "Reduction in Levels of Deoxynivalenol in Contaminated Corn by Chemical and Physical Treatment" Journal of Agricultural and Food Chemistry 34:465-467.

Young et al. (1986) "Reduction in Levels of Deoxynivalenol in Contaminated Wheat by Chemical and Physical Treatment" Journal of Agricultural and Food Chemistry 34:461-465.

Young et al. (1987) "Detoxification of Deoxynivalenol with Sodium Bisulfite and Evaluation of the Effects when Pure Myotoxin or Contaminated Corn was Treated and Given to Pigs" 35(2):259-261.

Yu et al. (2010) "Isolation of deoxynivalenol-transforming bacteria from the chicken intestines using the approach of PCR-DGGE guided microbial selection" BMC Microbiol. 10:182-191.

* cited by examiner

Figure 1

| Source of Enzymatic System | % of Control Final Ethanol Titer | % DON Mitigated by System |
|---|---|---|
| Average Control | 100% | 0 |
| Average *P. pastoris* Lysate | 99.6% | 94% |
| Average *P. pastoris* Purified Enzyme | 100% | 94% |
| Average *S. cerevisiae* Lysate | 100.4% | 99% |
| Average *S. cerevisiae* Purified Enzyme | 100.5% | 99% |
| Average *E. coli* Lysate | 100.3% | 96% |
| Average *E. coli* Purified Enzyme | 99.6% | 93% |

SEQUENCE LISTING

```
Sequence total quantity: 10
SEQ ID NO: 1             moltype = DNA  length = 1296
FEATURE                  Location/Qualifiers
misc_feature             1..1296
                         note = Synthetic
source                   1..1296
                         mol_type = other DNA
                         organism = synthetic construct
SEQUENCE: 1
atggttgaag cattgacaat tgatagagtt ccagatcata ttgctagagc agttgttgat  60
ccacatgctt atgcagaatg ggatggttta catgctatgt tggcagaatt aagaagagaa  120
catccatttg ctagagcaga tttggaaggt tacgatccat tttgggttgc ttctaaacat  180
gcagatattc aagaagtttg tagaagacat gatttgtacc aaaacggtac ttacttcatc  240
ggtacaagaa aggttttgga attagaatat tcaactggta aagcatctca agaaaagagtt  300
attcaagcta tgaatgcacc agaacacatg aaatacagaa gattaactca aggttggttc  360
caacctaaaa atttgagaaa attggatgaa agattcagaa gaatcgcaag aggttatgtt  420
```

```
gatcaaatgg ttgaattggg tggtgaatgt gaattttcc atgctattgg tgttagatac   480
ccattgttag ttattatgtc aatcttgggt ttgccagatg atgctgaagc ctttatgatg   540
agattgactc aaaacgttac aaacatggat gatgctgaat tgacaggttt accagctcca   600
aaaactgcag aagaaagagc acaaagatca ttagcaatgt ctaacgaagc tagagtttac   660
ttcgatgaat tgtcaagagc tagaagagca tctccaactg tgtttc aacattgatc   720
gctaacgcaa caatcgaagg taaaccaatt tctgaaccag atattttggg ttactacatg   780
actgttgcta ttgcaggtca tgatactaca tctgcatctg tgtctggtgc tatttgggct   840
ttagcagaaa gaccagctga attggcaaaa gttaaggcag atttgtcatt aatcccaaat   900
ttggttgaag aagctgttag atggactaca ccaattactc atttcttgag aacagcagtt   960
agagatactg ttttagagg tcaaccaatt gctaagggtg actacgtttt gttgtcatac  1020
acttctggta acagagatga agaagttttc gatgatccat tcgagtttaa agttggtaga  1080
aagaaaaatg aacaagttgc attcggttat ggtccacatg tttgtttggg tcaacatttg  1140
gctagaatgg aaatgaacat ttttctttgaa gaattgttgc caagattgaa atctttggaa  1200
ttagctggta caccacaaag aaagatcact tcttcaatgg gtggtccaaa atctgttcca  1260
attagatacc aaatgtcaca tcatcatcat catcat                             1296

SEQ ID NO: 2           moltype = DNA   length = 333
FEATURE                Location/Qualifiers
misc_feature           1..333
                       note = Synthetic
source                 1..333
                       mol_type = other DNA
                       organism = synthetic construct
SEQUENCE: 2
atggctaaat tgaatgttgt tactagaaaa ggtcaagaag ttgttttgga aggtgaagaa    60
ggtttgtctg ttatggaaat catcagagat ggtggtatcg atgaattgtt agctttgtgt   120
ggtggttgtt gttcttgtgc aacatgtcat gttcatgttg atccagcttt tgcagataaa   180
ttaccaccaa tttcagaaga tgaaaacgat ttgttagatt cttcagatca tagaaacgat   240
caatcaagat tgtcatgtca attgactttt tcagctgaat tggatggttt aagagttaca   300
attgcaccag aagatcatca tcatcatcat cat                                333

SEQ ID NO: 3           moltype = DNA   length = 1245
FEATURE                Location/Qualifiers
misc_feature           1..1245
                       note = Synthetic
source                 1..1245
                       mol_type = other DNA
                       organism = synthetic construct
SEQUENCE: 3
atggatcatt acgatgtttt gatcgttggt gctggtcatg gtggtgcaca agctgcagtt    60
tctttaagac aattgaactt cgaaggttca tcggttttgt taggtgacga agctgatcca   120
ccatacgaaa gaccaccatt gtctaaggaa tacttctcag gtgaaaagac tttcgaaaga   180
attttgatca acagagaactc ttttttgggt gacagaaacg tttcattgtt attgaacaga   240
agagttactg ctgttgatgt tccaggtcat agagttacta tagcagatgg ttcttcatta   300
tcttacggta aattgatttg ggctactggt ggtgcaccaa gagattatc atgtgttggt   360
ggtgacttga aaggtgttca tggtgttaga caaagagttg atgcagatgc tatgttgtct   420
gaaatcgaat cagttgaaca agttgttgtt attggtggtg gttatattgg tttagaagct   480
gcagctgttt tgtctaagtt cggtaaacat gttactgttt tggaagcatt ggatagagtt   540
ttagcaagag ttgctggtga accattgtca agattctacg aaaacgaaca tagagcacat   600
ggtgttgatg ttagattgaa tgcaatggtt actgaaattg agggtaaaga tggtcatgtt   660
tctggtgtta aattgggtga cggtacaatt ttgccagctc aaatggttat tgtcggtatc   720
ggtatcattc cagctgttga accattaatt gcagctggtg cagttggttc taatggtgtt   780
gatgttgatg aacattgtca acatcattg ccagatatat atgctattgg tgactgtgca   840
gctcatgtta atggttttgc agctgatgct agaattgat tagaatctgt tcaaaacgca   900
aacgatcaag caactacagc tgttaaagca aatttgactc aaccacaacc atatcatgct   960
gttccttggt tttggtctaa tcaatacgat ttgagattgc aaactgttgg ttttgtcaaca  1020
ggttttgatg aagttgttca aagaggtgac ccagcagcta gatcattttc tatcgtttat  1080
ttgagaaatg gtaaagttat tgctttggat tgtgttaacg cagttaagga ttacgttcaa  1140
ggtagagctt tagttactgg tggtattgca ccagctaaag atgcattggc taacccagaa  1200
atcccattga gacattggt tccagcacat catcatcatc atcat                   1245

SEQ ID NO: 4           moltype = DNA   length = 2710
FEATURE                Location/Qualifiers
misc_feature           1..2710
                       note = Synthetic
source                 1..2710
                       mol_type = other DNA
                       organism = synthetic construct
SEQUENCE: 4
tcgcgcgttt cggtgatgac ggtgaaaacc tctgacacat gcagctcccg gagacggtca    60
cagcttgtct gtaagcggat gccgggagca gacaagcccg tcagggcgcg tcagcgggtg   120
ttggcgggtg tcgggctgg cttaactatg cggcatcaga gcagattgta ctgagagtgc   180
accatatgcg gtgtgaaata ccgcacagat gcgtaaggag aaaataccgc atcaggcgcc   240
attcgccatt caggctgcgc aactgttggg aagggcgatc ggtgcgggcc tcttcgctat   300
tacgccagct ggcgaaaggg ggatgtgctg caaggcgatt aagttgggta acgccagggt   360
tttcccagtc acgacgttgt aaaacgacgg ccagtgaatt cgagctcggt acctcgcgaa   420
tgcatctaga tatcggatcc cgggcccgtc gactgcagag gcctgcatgc aagcttggcg   480
taatcatggt catagctgtt tcctgtgtga aattgttatc cgctcacaat tccacacaac   540
atacgagccg gaagcataaa gtgtaaagcc tggggtgcct aatgagtgag ctaactcaca   600
```

```
ttaattgcgt tgcgctcact gcccgctttc cagtcgggaa acctgtcgtg ccagctgcat   660
taatgaatcg gccaacgcgc ggggagaggc ggtttgcgta ttgggcgctc ttccgcttcc   720
tcgctcactg actcgctgcg ctcggtcgtt cggctgcggc gagcggtatc agctcactca   780
aaggcggtaa tacggttatc cacagaatca ggggataacg caggaaagaa catgtgagca   840
aaaggccagc aaaaggccag gaaccgtaaa aaggccgcgt tgctggcgtt tttccatagg   900
ctccgccccc ctgacgagca tcacaaaaat cgacgctcaa gtcagaggtg gcgaaacccg   960
acaggactat aaagatacca ggcgtttccc cctggaagct ccctcgtgcg ctctcctgtt  1020
ccgaccctgc cgcttaccgg atacctgtcc gcctttctcc cttcgggaag cgtggcgctt  1080
tctcatagct cacgctgtag gtatctcagt tcggtgtagg tcgttcgctc caagctgggc  1140
tgtgtgcacg aaccccccgt tcagcccgac cgctgcgcct tatccggtaa ctatcgtctt  1200
gagtccaacc cggtaagaca cgacttatcg ccactggcag cagccactgg taacaggatt  1260
agcagagcga ggtatgtagg cggtgctaca gagttcttga agtggtggcc taactacggc  1320
tacactagaa gaacagtatt tggtatctgc gctctgctga agccagttac cttcggaaaa  1380
agagttggta gctcttgatc cggcaaacaa accaccgctg gtagcggtgg tttttttgtt  1440
tgcaagcagc agattacgcg cagaaaaaaa ggatctcaag aagatccttt gatcttttct  1500
acggggtctg acgctcagtg gaacgaaaac tcacgttaag ggattttggt catgagatta  1560
tcaaaaagga tcttcaccta gatcctttta aattaaaaat gaagttttaa atcaatctaa  1620
agtatatatg agtaaacttg gtctgacagt taccaatgct taatcagtga ggcacctatc  1680
tcagcgatct gtctatttcg ttcatccata gttgcctgac tccccgtcgt gtagataact  1740
acgatacggg agggcttacc atctggcccc agtgctgcaa tgataccgcg agacccacgc  1800
tcaccggctc cagatttatc agcaataaac cagccagccg aagggccga gcgcagaagt  1860
ggtcctgcaa ctttatccgc ctccatccag tctattaatt gttgccggga agctagagta  1920
agtagttcgc cagttaatag tttgcgcaac gttgttgcca ttgctacagg catcgtggtg  1980
tcacgctcgt cgtttggtat ggcttcattc agctccggtt cccaacgatc aaggcgagtt  2040
acatgatccc ccatgttgtg caaaaaagcg gttagctcct tcggtcctcc gatcgttgtc  2100
agaagtaagt tggccgcagt gttatcactc atggttatgg cagcactgca taattctctt  2160
actgtcatgc catccgtaag atgcttttct gtgactggtg agtactcaac caagtcattc  2220
tgagaatagt gtatgcggcg accgagttgc tcttgcccgg cgtcaatacg ggataatacc  2280
gcgccacata gcagaacttt aaaagtgctc atcattggaa aacgttcttc ggggcgaaaa  2340
ctctcaagga tcttaccgct gttgagatcc agttcgatgt aacccactcg tgcacccaac  2400
tgatcttcag catcttttac tttcaccagc gtttctgggt gagcaaaaac aggaaggcaa  2460
aatgccgcaa aaaagggaat aagggcgaca cggaaatgtt gaatactcat actcttcctt  2520
tttcaatatt attgaagcat ttatcagggt tattgtctca tgagcggata catatttgaa  2580
tgtatttaga aaaataaaca ataggggtt ccgcgcacat ttccccgaaa agtgccacct  2640
gacgtctaag aaaccattat tatcatgaca ttaacctata aaaataggcg tatcacgagg  2700
ccctttcgtc                                                        2710
```

SEQ ID NO: 5           moltype = DNA   length = 7667
FEATURE                Location/Qualifiers
misc_feature           1..7667
                       note = Synthetic
source                 1..7667
                       mol_type = other DNA
                       organism = synthetic construct
SEQUENCE: 5

```
agatctaaca tccaaagacg aaaggttgaa tgaaaccttt tgccatccg acatccacag     60
gtccattctc acacataagt gccaaacgca acaggagggg atacactagc agcagaccgt   120
tgcaaacgca ggacctccac tcctcttctc ctcaacaccc acttttgcca tcgaaaaacc   180
agcccagtta ttgggcttga ttggagctcg ctcattccaa ttccttctat taggctacta   240
acaccatgac tttattagcc tgtctatcct ggcccccctg cgcgaggttca tgtttgttta   300
tttccgaatg caacaagctc cgcattacac ccgaacatca ctccagatga gggctttgtg   360
agtgtggggt caaatagttt catgttcccc aaatggccca aaactgacag tttaaacgct   420
gtcttggaac ctaatatgac aaaagcgtga tctcatccaa gatgaactaa gtttggttcg   480
ttgaaatgct aacggccagt tggtcaaaaa gaaacttcca aaagtcggca taccgttgt    540
cttgttttggt attgattgac gaatgctcaa aaataatcct attaatgctt agcgcagtct   600
ctctatcgct tctgaacccc ggtgcacctg tgccgaaacg caaatgggga aacacccgct   660
ttttggatga ttatgcattg tctccacatt gtatgcttcc aagattctgg tgggaatact   720
gctgatagcc taacgttcat gatcaaaatt taactgttct aacccctact tgacagcaat   780
atataaacag aaggaagctg ccctgtctta aaccttttct tttatcatca ttattagctt   840
actttcataa ttgcgactgg ttccaattga caagcttttg attttaacga cttttcaacga   900
caacttgaga agatcaaaaa acaactaatt attcgaaacg gaattccgga ccggcatgcc   960
aaggcctcag gtaccggccg gccatttaaa tacaggcccc ttttccttg tcgatatcat    1020
gtaattagtt atgtcacgct tacattcacg ccctcctccc acatccgctc taaccgaaaa   1080
ggaaggagtt agacaacctg aagtctaggt ccctattat ttttttttaat agttatgtta   1140
gtattaagaa cgttatttat atttcaaatt tttcttttt ttctgtacaa acgcgtgtac    1200
gcatgtaaca ttatactgaa aaccttgctt gagaagtttt tgggacgctc gaaggcttta   1260
atttgcaagc tggatccgcg gccgccttcc aaactctcat ggattctcag gtaataggta   1320
ttctaggagg aggccagcta ggccgaatga ttgttgaggc cgctagcagg ctcaatatca   1380
agaccgtgat tcttgatgat ggttttttcac cattaatgct gcgcaagacc              1440
acatcgacgg atcattcaaa gatgaggagg ctatcgccaa gttagctgcc aaatgtgatg   1500
ttctcactgt agagattgag catgtcaaca cagatgctct aaagagagtt caagacagaa   1560
ctggaatcaa gatatatcct ttaccagaga caatcgaact aatcaaggat aagtacttgc   1620
aaaaggaaca tttgatcaag cacaacatt cggtgacaaa gtctcagggt atagaatcta    1680
atgaaaagc gctgctttt ttgggagaag agaatggatt tccatatctg ttgaagtccc     1740
ggactatgcc ttatgatgga agaggcaatt ttgtagtgga gtctaaagag gacatcagta   1800
aggcattaga gttcttgaaa gatcgtccat gtatgccga agagtttgct ccttttgtta    1860
aagaattagc ggtaatggtt gtgagatcac tggaaggcga agtattctcc tacccaaccg   1920
tagaaactgt gcacaaggac aatatctgtc atattgtgta tgctccggcc agagttaatg   1980
acaccatcca aagaaaagct caaatattag ctgaaaacac tgtgaagact tcccaggcg    2040
```

```
ctggaatctt cggagttgag atgttcctat tgtctgatgg agaacttctt gtaaatgaga   2100
ttgctccaag gccccacaat tctggtcact atacaatcga tgcatgtgta acatctcagt   2160
tcgaagcaca tgtaagagcc ataactggtc tgccaatgcc actagatttc accaaactat   2220
ctacttccaa caccaacgct attatgctca atgttttggg tgctgaaaaa tctcacgggg   2280
aattagagtt ttgtagaaga gccttagaaa cacccggctc ttctgtatat ctgtacggaa   2340
agaccacccg attggctcgt aagatgggtc atatcaacat aataggatct tccatgttgt   2400
aagcagaaca aaagttagag tacattctag aagaatcaac ccacttacca tccagtactg   2460
tatcagctga cactaaaccg ttggttggag ttatcatggg ttcagactct gatctacctg   2520
tgatttcgaa aggttgcgat atttaaaac agtttggtgt tccattcgaa gttactattg   2580
tctctgctca tagaacacca cagagaatga ccagatatgc ctttgaagcc gctagtagag   2640
gtatcaaggc tatcattgca ggtgctggtg tgctgctca tcttccagga atggttgctg   2700
ccatgactcc gttgccagtc attggtgttc ctgtcaaggg ctctacgttg atggtgtag   2760
actcgctaca ctcgattgtc caaatgccta gaggtgttcc tgtggctacg gttgctatca   2820
acaacgccac caatgccgct ctgttggcca tcaggatttt aggtacaatt gaccacaaat   2880
ggcaaaagga aatgtccaag tatatgaatg caatggagac cgaagtgttg gggaaggcat   2940
ccaacttgga atctgaaggg tatgaatcct atttgaagaa tcgtctttga atttagtatt   3000
gttttttaat agatgtatat ataatagtac acgtaactta tctattccat tcataatttt   3060
attttaaagg ttcggtagaa atttgtcctc caaaaagttg ggagagcct ggcagtttta   3120
ataggcatta ttatagattg ggtaatattt accctgcacc tggaggaact ttgcaaagag   3180
cctcatgtgc ggcgcgccag gccataatgg ccaaacggtt tctcaattac tatatactac   3240
taaccattta cctgtagcgt atttctttc cctcttcgcg aaagctcaag ggcatcttct   3300
tgactcatga aaaatatctg gatttcttct gacagatcat caccccttgag ccaactctc   3360
tagcctatga gtgtaagtga tagtcatctt gcaacagatt attttggaac gcaactaaca   3420
aagcagatac acccttcagc agaatccttt ctggatattg tgaagaatga tcgccaaagt   3480
cacagtcctg agacagttcc taatctttac cccatttaca agttcatcca atcagacttc   3540
ttaacgcctc atctggctta tatcaagctt accaacagtt cagaaactcc cagtccaagt   3600
ttcttgcttg aaagtgcgaa gaatggtgac accgttgaca ggtacacctt tatgggacat   3660
tcccccagaa aaataatcaa gactgggcct ttagagggtg ctgaagttga ccccttggtg   3720
cttctggaaa aagaactgaa gggcaccaga caagcgcaac ttcctggtat tcctcgtcta   3780
agtggtggtg ccataggata catctcgtac gattgtatta agtactttga accaaaaact   3840
gaaagaaaac tgaaagatgt tttgcaactt ccggaagcag ctttgatgtt gttcgacacg   3900
atcgtggctt ttgacaatgt ttatcaaaga ttccaggtaa ttggaaacgt ttctctatcc   3960
gttgatgact cggacgaagc tattcttgag aaatattata agacaagaga agaagtggaa   4020
aagatcagta aagtggtatt tgacaataaa actatgaaca gaaagatatt   4080
attcaaggcc aaacgttcac ctctaatatt ggtcaggaag ggtatgaaaa ccatgttcgc   4140
aagctgaaag aacatattct gaaggagac atcttccaag ctgttccctc tcaaagggta   4200
gccaggccga cctcattgca ccctttcaac atctatcgtc atttgagaac tgtcaatcct   4260
tctccataca tgttctatat tgactatcta gacttccaag ttgttggtgc ttcacctgaa   4320
ttactagtta aatccgacaa caacaacaaa atcatcacac atcctattgc tggaactctt   4380
cccagaggta aaactatcga agaggacgac aattatgcta agcaattgaa gtcgtctttg   4440
aaagacaggg ccgagcacgt catgctgta gatttggcca gaaatgatat taaccgtgtg   4500
tgtgagccca ccagtaccac ggttgatcgt ttattgactg tggagagatt ttctcatgtg   4560
atgcatcttg tgtcagaagt cagtggaaca ttgagaccaa acaagactcg cttcgatgct   4620
ttcagatcca tttccccagc aggaaccgtc tccggtgctc cgaaggtaag agcaatgcaa   4680
ctcataggag aattggaagg agaaaagaga ggtgtttatg cgggggccgt aggacactgg   4740
tcgtacgatg gaaaatcgat ggacacatgt attgccttaa gaacaatggt cgtcaaggac   4800
ggtgtcgctt accttcaagc cggaggtgga atttgtctca attctgaccc ctatgacgag   4860
tacatcgaaa ccatgaacaa aatgagatcc aacaataaca ccatcttgga ggctgagaaa   4920
atctggaccg ataggttggc cagagacgag aatcaaagtg aatccgaaga aaacgatcaa   4980
tgaacggagg acgtaagtag gaatttatgg tttggccata atggcctagc ttggcgtaat   5040
catgtcagta gctgtttcct gtgtgaaatt gttatccgct cacaattcca cacaacatac   5100
gagccggaag cataaagtgt aaagcctggg gtgcctaatg agtgagctaa ctcacattaa   5160
ttgcgttgcg ctcactgccc gctttccagt cgggaaacct gtcgtgccag ctgcattaat   5220
gaatcggcca acgcgcgggg agaggcggtt tgcgtattgg gcgctcttcc gcttcctcgc   5280
tcactgactc gctgcgctcg gtcgttcggc tgcggcgagc ggtatcagct cactcaaagg   5340
cggtaatacg gttatccaca gaatcagggg ataacgcagg aaagaacatg tgagcaaaag   5400
gccagcaaaa ggccaggaac cgtaaaaagg ccgcgttgct ggcgtttttc cataggctcc   5460
gcccccctga cgagcatcac aaaaatcgac gctcaagtca gaggtggcga acccgacagg   5520
gactataaag ataccaggcg tttccccctg gaagctccct cgtgcgctct cctgttccga   5580
ccctgccgct taccggatac ctgtccgcct ttctcccttc gggaagcgtg gcgctttctc   5640
atagctcacg ctgtaggtat ctcagttcgg tgtaggtcgt tcgctccaag ctgggctgtg   5700
tgcacgaacc ccccgttcag cccgaccgct gcgccttatc cggtaactat cgtcttgagt   5760
ccaacccggt aagacacgac ttatcgccac tggcagcagc cactggtaac aggattagca   5820
gagcgaggta tgtaggcggt gctacagagt tcttgaagtg gtggcctaac tacggctaca   5880
ctagaaggac agtatttggt atctgcgctc tgctgaagcc agttaccttc ggaaaaagag   5940
ttggtagctc ttgatccggc aaacaaacca ccgctggtag cggtggtttt tttgtttgca   6000
agcagcagat tacgcgcaga aaaaaggat ctcaagaaga tcctttgatc ttttctacgg   6060
ggtctgacgc tcagtggaac gaaaactcac gttaagggat tttggtcatg agattatcaa   6120
aaaggatctt cacctagatc cttttaaatt aaaaatgaag ttttaaatca atctaaagta   6180
tatatgagta aacttggtct gacagttacc aatgcttaat cagtgaggca cctatctcag   6240
cgatctgtct atttcgttca tccatagttg cctgactccc cgtcgtgtag ataactacga   6300
tacgggaggg cttaccatct ggccccagtg ctgcaatgat accgcgagac ccacgctcac   6360
cggctccaga tttatcagca ataaaccagc cagccggaag ggccgagcgc agaagtggtc   6420
ctgcaacttt atccgcctcc atccagtcta ttaattgttg ccgggaagct agagtaagta   6480
gttcgccagt taatagtttg cgcaacgttg ttgccattgc tacaggcatc gtggtgtcac   6540
gctcgtcgtt tggtatggct tcattcagct ccggttccca acgatcaagg cgagttacat   6600
gatccccat gttgtgcaaa aaagcggtta gctccttcgg tcctccgatc gttgtcagaa   6660
gtaagttggc cgcagtgtta tcactcatgg ttatggcagc actgcataat tctcttactg   6720
tcatgccatc cgtaagatgc ttttctgtga ctggtgagta ctcaaccaag tcattctgag   6780
```

```
aatagtgtat gcggcgaccg agttgctctt gcccggcgtc aatacggat aataccgcgc    6840
cacatagcag aactttaaaa gtgctcatca ttggaaaacg ttcttcgggg cgaaaactct    6900
caaggatctt accgctgttg agatccagtt cgatgtaacc cactcgtgca cccaactgat    6960
cttcagcatc ttttactttc accagcgttt ctgggtgagc aaaaacagga aggcaaaatg    7020
ccgcaaaaaa gggaataagg gcgacacgga aatgttgaat actcatactc ttccttttc    7080
aatattattg aagcatttat caggggttatt gtctcatgag cggatacata tttgaatgta    7140
tttagaaaaa taaacaaata ggggttccgc gcacatttcc ccgaaaagtg ccacctgacg    7200
tctaagaaac cattattatc atgacattaa cctataaaaa taggcgtatc acgaggccct    7260
ttcgtctcgc gcgtttcggt gatgacggtg aaaacctctg acacatgcag ctcccggaga    7320
cggtcacagc ttgtctgtaa gcggatgccg ggagcagaca gcccgtcag ggcgcgtcag     7380
cgggtgttgg cgggtgtcgg ggctggctta actatgcggc atcagagcag attgtactga    7440
gagtgcacca tatgcggtgt gaaataccgc acagatgcgt aaggagaaaa taccgcatca    7500
ggcgccattc gccattcagg ctgcgcaact gttgggaagg gcgatcggtg cgggcctctt    7560
cgctattacg ccagctggcg aaaggggat gtgctgcaag cggtttaagt tgggtaacgc      7620
cagggttttc ccagtcacga cgttgtaaaa cgacggccag tgaattg                   7667

SEQ ID NO: 6             moltype = DNA  length = 7732
FEATURE                  Location/Qualifiers
misc_feature             1..7732
                         note = Synthetic
source                   1..7732
                         mol_type = other DNA
                         organism = synthetic construct
SEQUENCE: 6
agatctaaca tccaaagacg aaaggttgaa tgaaaccttt ttgccatccg acatccacag     60
gtccattctc acacataagt gccaaacgca acaggaggat atacactagc agcagaccgt    120
tgcaaacgca ggacctccac tcctcttctc ctcaacaccc acttttgcca tcgaaaaacc    180
agcccagtta ttgggcttga ttggagctcg ctcattccaa ttccttctat taggctacta    240
acaccatgac tttattagcc tgtctatcct ggcccccctg cgcgaggttca tgtttgttta   300
tttccgaatg caacaagctc cgcattacac ccgaacatca ctccagatga gggcttttg     360
agtgtggggt caaatagttt catgttcccc aaatggccca aaactgacag tttaaacgct    420
gtcttggaac ctaatatgac aaaagcgtga tctcatccaa gatgaactaa gtttggttcg    480
ttgaaatgct aacggccagt tggtcaaaaa gaaacttcca aaagtcggca taccgttttgt   540
cttgtttggt attgattgac aatgctcaa aaataatctc attaatgctt agcgcagtct     600
ctctatcgct tctgaaccccc ggtgcacctg tgccgaaacg caaatgggga aacacccgct   660
ttttggatga ttatgcattg tctccacatt gtatgcttcc aagattctgg tgggaatact    720
gctgatagcc taacgttcat gatcaaaatt taactgttct aacccctact tgacagcaat    780
atataaacag aaggaagctg ccctgtctta aaccttttt tttatcatca ttattagctt      840
acttttcataa ttgcgactgg ttccaattga caagctttg atttttaacga cttttaacga   900
caacttgaga agatcaaaaa acaactaatt attcgaaacg gaattccgga ccggcatgca    960
ggcctggtac cggccggcca tttaaataca ggcccctttt cctttgtcga tatcatgtaa   1020
ttagttatgt cacgcttaca ttcacgcccct ctcccacat ccgctctaac cgaaaaggaa   1080
ggagttagac aacctgaagt ctaggtccct attatttt tttaatagtt atgttagtat     1140
taagaacgtt atttatattt caaattttc tttttttct gtacaaacgc gtgtacgcat    1200
gtaacattat actgaaaacc ttgcttgaga aggttttggg acgctcgaag gctttaattt   1260
gcaagctgga tccgcggccg cgacttgact cttcactagc ctatgcaaat aaggttacct   1320
tttccaagaa tcgtagaaac gattaaaaaa cttccaaact ctcatggatt ctcaggtaat   1380
aggtattcta ggaggaggcc agctaggccg aatgattgtt gaggccgcta gcaggctcaa   1440
tatcaagacc gtgattcttg atgatggttt ttcacctgct aagcacatta atgctgcgca   1500
agaccacatc gacggatcat tcaaagatga ggaggctatc gccaagttag ctgccaaatg   1560
tgatgttctc actgtagaga ttgagcatgt caacacagat gctctaaaga gagttcaaga   1620
cagaactgga atcaagatat atcctttacc agagacaatc gaactaatca aggataagta   1680
cttgcaaaag gaacatttga tcaagcacaa catttcggtg acaaagtctc agggtataga   1740
atctaatgaa aaggcgctgc ttttgtttgg agaagagaat ggatttccat atctgttgaa   1800
gtcccggact atggctatg atggaagagg caattttgta gtggagtcta aagaggacat    1860
cagtaaggca ttagagttct tgaaagatcg tccattgtat gccgagaagt ttgctccttt   1920
tgttaaagaa ttagcggtaa tggttgtgag atcactggaa ggcgaagtat tctcctaccc   1980
aaccgtagaa actgtgcaca aggacaatat ctgtcatatt gtgtatgctc cggccagagt   2040
taatgacacc atccaaaaga aagctcaaat attagctgaa aaccactgta agactttccc   2100
aggcgctgga atcttcggag ttgagatgtt cctattgtct gatggagaac ttcttgtaaa   2160
tgagattgct ccaaggccc acaattctgg tcactataca atcgatgcat gtgtaacatc    2220
tcagttcgaa gcacatgtaa gagccataac tggtctgcca atgccactag atttcaccaa   2280
actatctact tccaacacca acgctattat gctcaatgtt ttgggtgctg aaaaatctca   2340
cgggaatta gagtttttgta gaagagcctt agaaacaccc ggtgcttctg tatatctgta   2400
cggaaagacc acccgattgg ctcgtaagat gggtcatatc aacataatag gatcttccat   2460
gttggaagca gaacaaaagt tagagtacat tctagaagaa tcaacccact taccatccag   2520
tactgtatca gctgacacta aaccgttggt tggagttatc atgggttcag actctgatct   2580
acctgtgatt tcgaaaggtt gcgatatttt aaaaacagttt ggtgttcat tcgaagttac   2640
tattgtctct gctcatagaa caccacagag aatgccttg aagccgcta tgagccgcta    2700
tagaggtatc aaggctatca ttgcaggtgc tggtggtgct gctcatcttc caggaatggt   2760
tgctgccatg actccgttgc cagtcattgg tgttcctgtc aagggctcta cgttggatgg   2820
tgtagactcg ctacactcga ttgtccaaat gcctagaggt gttcctgtgg ctacggttgc   2880
tatcaacaac gccaccaatg ccgctctgtt ggccatcagg attttaggta caattgacca   2940
caaatggcaa aaggaaatgt ccaagtatat gaatgcaaga gaccgaagtg ttgggaga     3000
ggcatccaac ttggaatctg aagggtatga atcctatttg aagaatcgtc tttgaattta   3060
gtattgttttt taatagatg tatatataat agtacgcta acttatctat tccattcata   3120
attttatttt aaaggttcgg tagaaatttg tcctccaaaa agttggttag agcctggcag   3180
ttttgatagg cattattata gattgggtaa tatttacccct gcacctggag gaactttgca   3240
aagagcctca tgtgcggcgc gccaggccat aatggccaaa cggtttctca attactatat   3300
```

```
actactaacc atttacctgt agcgtatttc ttttccctct tcgcgaaagc tcaagggcat   3360
cttcttgact catgaaaaat atctggattt cttctgacag atcatcaccc ttgagcccaa   3420
ctctctagcc tatgagtgta agtgatagtc atccttgcaac agattatttt ggaacgcaac  3480
taacaaagca gatacaccct tcagcagaat cctttctgga tattgtgaag aatgatcgcc   3540
aaagtcacag tcctgagaca gttcctaatc tttacccccat ttacaagttc atccaatcag  3600
acttcttaac gcctcatctg gcttatatca agcttaccaa cagttcagaa actcccagtc   3660
caagttctct tgcttgaaagt gcgaagaatg gtgacaccgt tgacaggtac acctttatgg  3720
gacattcccc cagaaaaata atcaagactg ggcctttaga gggtgctgaa gttgaccccct 3780
tggtgcttct ggaaaaagaa ctgaagggca ccagacaagc gcaacttcct ggtattcctc   3840
gtctaagtgg tggtgccata ggatacatct cgtacgattg tattaagtac tttgaaccaa   3900
aaaactgaaag aaaactgaaa gatgttttgc aacttccgga agcagctttg atgttgttcg   3960
acacgatcgt ggcttttgac aatgtttatc aaagattcca ggtaattgga aacgtttctc   4020
tatccgttga tgactcggac gaagctattc ttgagaaata ttataagaca agagaagaag   4080
tggaaaagat cagtaaagtg gtatttgaca ataaaactgt tccctactat gaacagaaag   4140
atattattca aggccaaacg ttcacctcta atattggtca ggaagggtat gaaaaccatg   4200
ttcgcaagct gaaagaacat attctgaaag agacatctt ccaagctgtt ccctctcaaa    4260
gggtagccag gccgacctca ttgcacccctt tcaacatcta tcgtcatttg agaactgtca  4320
atccttctcc atacatgttc tatattgact atctagactt ccaagttgtt ggtgcttcac   4380
ctgaattact agttaaatcc gacaacaaca acaaaatcat cacacatcct attgctggaa   4440
ctcttcccag aggtaaaact atcgaagagg acgacaatta tgctaagcaa ttgaagtcgt   4500
ctttgaaaga cagggccgag cacgtcatgc tggtagattt ggcagaaaat gatattaacc   4560
gtgtgtgtga gcccaccagt accacggttg atcgtttatt gactgtggag agattttctc   4620
atgtgatgca tcttgtgtca gaagtcagtg gaacattgag accaaacaag actcgcttcg   4680
atgctttcag atccatttttc ccagcaggaa ccgtctccgg tgctccgaag gtaagagcaa   4740
tgcaactcat aggagaattg gaaggagaaa agagaggtgt ttatgcgggg gccgtaggac   4800
actggtcgta cgatgaaaaa tcgatggaca catgtattgc cttaagaaca atggtcgtca   4860
aggacggtgt cgcttacctt caagccggag gtggaattgc ctacgattct gacccctatg   4920
acgagtacat cgaaaccatg aacaaaatga atccaacaa taacaccatc ttggaggctg    4980
agaaaatctg gaccgatagg ttggccagag acgagaatca aagtgaatcc gaagaaaacg   5040
atcaatgaac ggaggacgta agtaggaatt tatggtttgg ccataatggc ctagcttggc   5100
gtaatcatgg tcatagctgt ttcctgtgtg aaattgttat ccgctcacaa ttccacacaa   5160
catacgagcc ggaagcataa agtgtaaagc ctggggtgcc taatgagtga gctaactcac   5220
attaattgcg ttgcgctcac tgcccgcttt ccagtcggga aacctgtcgt gccagctgca   5280
ttaatgaatc ggccaacgcg cggggagagg cggtttgcgt attgggcgct cttccgcttc   5340
ctcgctcact gactcgctgc gctcggtcgt tcggctgcgg cgagcggtat cagctcactc   5400
aaaggcggta atacgttat ccacagaatc aggggataac gcaggaaaga acatgtgagc    5460
aaaaggccag caaaaggcca ggaaccgtaa aaaggccgcg ttgctggcgt ttttccatag   5520
gctccgcccc cctgacgagc atcacaaaaa tcgacgctca agtcagaggt ggcgaaaccc   5580
gacaggacta taaagatacc aggcgtttcc ccctggaagc tccctcgtgc gctctcctgt   5640
tccgaccctg ccgcttaccg gatacctgtc cgcctttctc ccttcgggaa gcgtggcgct   5700
ttctcatagc tcacgctgta ggtatctcag ttcggtgtag tcgttcgct ccaagctggg    5760
ctgtgtgcac gaaccccccg ttcagcccga ccgctgcgcc ttatccggta actatcgtct   5820
tgagtccaac ccggtaagac acgacttatc gccactggca gcagccactg gtaacaggat   5880
tagcagagcg aggtatgtag gcggtgctac agagttcttg aagtggtggc ctaactacgg   5940
ctacactaga aggacagtat ttggtatctg cgctctgctg aagccagtta ccttcggaaa   6000
aagagttggt agctcttgat ccggcaaaca aaccaccgct ggtagcggtg ttttttttgt    6060
ttgcaagcag cagattacgc gcagaaaaaa aggatctcaa gaagatcctt tgatcttttc   6120
tacggggtct gacgctcagt ggaacgaaaa ctcacgttaa gggattttgg tcatgagatt   6180
atcaaaaagg atcttcacct agatcctttt aaattaaaaa tgaagtttta atcaatcta    6240
aagtatatat gagtaaactt ggtctgacag ttaccaatgc ttaatcagtg aggcacctat   6300
ctcagcgatc tgtctatttc gttcatccat agttgcctga ctccccgtcg tgtagataac   6360
tacgatacgg gagggcttac catctggccc cagtgctgca atgataccgc gagacccacg   6420
ctcaccggct ccagatttat cagcaataaa ccagccagcc ggaagggccg agcgcagaag   6480
tggtcctgca actttatccg cctccatcca gtctattaat tgttgccggg aagctagagt   6540
aagtagttcg ccagttaata gtttgcgcaa cgttgttgcc attgctacag gcatcgtggt   6600
gtcacgctcg tcgtttggta tggcttcatt cagctccggt tcccaacgat caaggcgagt   6660
tacatgatcc cccatgttgt gcaaaaaagc ggttagctcc ttcggtcctc cgatcgttgt   6720
cagaagtaag ttggccgcag tgttatcact catggttatg gcagcactgc ataattctct   6780
tactgtcatg ccatccgtaa gatgcttttc tgtgactggt gagtactcaa ccaagtcatt   6840
ctgagaatag tgtatgcggc gaccgagttg ctcttgcccg gcgtcaatac gggataatac   6900
cgcgccacat agcagaactt taaaagtgct catcattgga aaacgttctt cgggggcgaaa  6960
actctcaagg atcttaccgc tgttgagatc cagttcgatg taacccactc gtgcacccaa   7020
ctgatcttca gcatctttta ctttcaccag cgtttctggg tgagcaaaaa caggaaggca   7080
aaatgccgca aaaaagggaa taagggcgac acggaaatgt tgaatactca tactcttcct   7140
ttttcaatat tattgaagca tttatcaggg ttattgtctc atgagcggat acatatttga   7200
atgtatttag aaaaataaac aaatagggggt tccgcgcaca tttccccgaa aagtgccacc   7260
tgacgtctaa gaaaccatta tatcatgaca attaacctat aaaaataggc gtatcacgag   7320
gccctttcgt ctcgcgcgtt tcggtgatga cggtgaaaac ctctgacaca tgcagctccc   7380
ggagacggtc acagcttgtc tgtaagcgga tgccggagc agacaagccc gtcagggcgc    7440
gtcagcgggt gttggcgggt gtcggggctg gcttaactat gcggcatcag agcagattgt   7500
actgagagtg caccatatgc ggtgtgaaat accgcacaga tgcgtaagga gaaaataccg   7560
catcaggcgc cattcgccat tcaggctgcg caactgttgg gaagggcgat cggtgcgggc   7620
ctcttcgcta ttacgccagc tggcgaaagg gggatgtgct gcaaggcgat taagttgggt   7680
aacgccaggg ttttcccagt cacgacgttg taaaacgacg gccagtgaat tg           7732
```

```
SEQ ID NO: 7              moltype = DNA  length = 7898
FEATURE                   Location/Qualifiers
misc_feature              1..7898
                          note = Synthetic
source                    1..7898
                          mol_type = other DNA
                          organism = synthetic construct
SEQUENCE: 7
agatctaaca tccaaagacg aaaggttgaa tgaaaccttt ttgccatccg acatccacag   60
gtccattctc acacataagt gccaaacgca acaggagggg atacactagc agcagaccgt  120
tgcaaacgca ggacctccac tcctcttctc ctcaacaccc acttttgcca tcgaaaaacc  180
agcccagtta ttgggcttga ttggagctcg ctcattccaa ttccttctat taggctacta  240
acaccatgac tttattagcc tgtctatcct ggcccccctg gcgaggttca tgtttgttta  300
tttccgaatg caacaagctc cgcattacac ccgaacatca ctccagatga gggctttctg  360
agtgtggggt caaatagttt catgttcccc aaatggccca aaactgacag tttaaacgct  420
gtcttggaac ctaaatgtga aaaagcgtga tctcatccaa gatgaactaa gtttggttcg  480
ttgaaatgct aacggccagt tggtcaaaaa gaaacttcca aaagtcggca taccgtttgt  540
cttgtttggt attgattgac gaatgctcaa aaataatctc attaatgctt agcgcagtct  600
ctctatcgct tctgaacccc ggtgcacctg tgccgaaacg caaatgggga aacacccgct  660
ttttggatga ttatgcattg tctccacatt gtatgcttcc aagattctgg tgggaatact  720
gctgatagcc taacgttcat gatcaaaatt taactgttcc aaccccctac tgacagcaat  780
atataaacag aaggaagctg ccctgtctta aacctttttt tttatcatca ttattagctt  840
actttcataa ttgcgactgg ttccaattga caagcttttg attttaacga cttttaacga  900
caacttgaga agatcaaaaa acaactaatt attcgaaacg atgagatttc cttcaatttt  960
tactgctgtt ttattcgcag catcctccgc attagctgct ccagtcaaca ctacaacaga 1020
agatgaaacg gcacaaattc cggctgaagc tgtcatcggt tactcagatt tagaagggga 1080
tttcgatgtt gctgttttgc cattttccaa cagcacaaat aacgggttat tgtttataaa 1140
tactactatt gccagcattg ctgctaaaga agaaggggta tctctcgaga aaaggcctca 1200
ggtaccggcc ggccatttaa ataccaggcc cttttccttt gtcgatatca tgtaattagt 1260
tatgtcacgc ttacattcac gccctcctcc cacatccgct ctaaccgaaa aggaaggagt 1320
tagacaacct gaagtctagg tcccctattta tttttttttaa tagttatgtt agtattaaga 1380
acgttattta tatttcaaat ttttctttttt tttctgtaca aacgcgtgta cgcatgtaac 1440
attatactga aaaccttgct tgagaaggtt ttgggacgct cgaaggcttt aatttgcaag 1500
ctggatccgc ggccgccttc caaactctca tggattctca ggtaataggt attctaggag 1560
gaggccagct aggccgaatg attgttgagg ccgctagcag gctcaatatc aagaccgtga 1620
ttcttgatga tggttttttca cctgctaagc acattaatgc tgcgcaagac cacatcgacg 1680
gatcattcaa agatgaggag gctatcgcca agttagctgc caaatgtgat gttctcactg 1740
tagagattga gcatgtcaac acagatgctc taaagagagt tcaagacaga actggaatca 1800
agatatatcc tttaccagag acaatcgaac taatcaagga taagtacttg caaaaggaac 1860
atttgatcaa gcacaacatt tcggtgacaa agtctcaggg tatagaatct aatgaaaagg 1920
cgctgctttt gtttggagaa gagaatggat ttccatatct gttgaagtcc cggactatgg 1980
cttatgatgg aagaggcaat tttgtagtgg agtctaaaga ggacatcgat aaggcattag 2040
agttcttgaa agatcgtcca ttgtatgccg agaagtttgc tccttttgtt aaagaattag 2100
cggtaatggt tgtgagatca ctggaaggcg aagtattctc ctacccaacc gtagaaactg 2160
tgcacaagga caatatctgt catattgtgt atgctccggc cagagttaat gacaccatcc 2220
aaaagaaagc tcaaatatta gctgaaaaca ctgtgaagac tttcccaggc gctggaatct 2280
tcggagttga gatgttccta ttgtctgatg gagaacttct tgtaaatgag attgctccaa 2340
ggccccacaa ttctggtcac tatacaatcg atgcatgtgt aacatctcag ttcgaagcac 2400
atgtaagagc cataactggt ctgccaatgc cactagattt caccaaacta tctacttcca 2460
acaccaaagc tattatgctc aatgttttgg gtgctgaaaa atctcacggg gaattagaat 2520
tttgtagaag agccttagaa acacccggtg cttctgtata tctgtacgga aagaccaccc 2580
gattggctcg taagatgggt catatcaaca taataggatc ttccatgttg aagcagaac 2640
aaaagttaga gtacattcta gaagaatcaa cccacttacc atccagtact gtatcagctg 2700
acactaaacc gttggttgga gttatcatgg gttcagactc tgatctacct gtgatttcga 2760
aaggttgcga tatttaaaa cagtttggtg ttccattcga agttactatt gtctctgctc 2820
atagaacacc acagagaatg accagatatg cctttgaagc cgctagtaga ggtatcaagg 2880
ctatcattgc aggtgctggt ggtgctgctc atcttccagg aatggttgct gccatgactc 2940
cgttgccagt cattggtgtt cctgtcaagg gctctacgtt ggatggtgta gactcgctac 3000
actcgattgt ccaaatgcct agaggtgttc ctgtggctac ggttgctatc aacaacgcca 3060
ccaatgccgc tctgttggcc atcaggattt taggtacaat tgaccacaaa tggcaaaagg 3120
aaatgtccaa gtatatgaat gcaatggaga ccgaagtgtt ggggaaggca tccaacttgg 3180
aatctgaagg gtatgaatcc tatttgaaga atcgtctttg aatttagtat tgttttttaa 3240
tagtatgtata taatagta cacgtaactt atctataatt ttcataattt tattttaaag 3300
gttcggtaga aatttgtcct ccaaaaagtt ggttagagcc tggcagtttt gataggcatt 3360
attatagatt gggtaatatt taccctgcac ctggaggaac tttgcaaaga gcctcatgtg 3420
cggcgcgcca ggcataatg gccaaacggt ttctcaatta ctatatacta ctaacctttt 3480
acctgtagcg tatttcttt ccctcttcgc gaaagctcga gggcatcttc ttgactcatg 3540
aaaaatatct ggatttcttc tgacagatca tcacccttga gcccaactct ctagcctatg 3600
agtgtaagtg atagtcatct tgcaacagat tattttggaa cgcaactaac aaagcagata 3660
cacccttcag cagaatcctt tctggatatt gtgaagaatg atcgcaaagg tcacagtcct 3720
gagacagttc ctaatcttta ccccatttac aagttcatcc aatcagactt cttacgcgct 3780
catctggctt atatcaagct taccaacagt tcagaaactc ccagtccaag tttcttgctt 3840
gaaagtggtg aaatggtga caccgttgac aggtacacct ttatgggaca ttcccccaga 3900
aaaataatca agactgggcc tttagagggt gctgaagttg accccttggt gcttctggaa 3960
aaagaactga agggcaccag acaagcgcaa cttcctggta ttcctcgtct aagtggtggt 4020
gccatagat acatctcgta cgattgtatt aagtactttg aaccaaaaac tgaaagaaaa 4080
ctgaaagatg ttttgcaact tccggaagca gctttgatgt tgttcgacac gatcgtggct 4140
tttgacaatg tttatcaaag attccaggta attggaaacg tttctctatc cgttgatgac 4200
```

-continued

```
tcggacgaag ctattcttga gaaatattat aagacaagag aagaagtgga aaagatcagt 4260
aaagtggtat ttgacaataa aactgttccc tactatgaac agaaagatat tattcaaggc 4320
caaacgttca cctctaatat tggtcaggaa gggtatgaaa accatgttcg caagctgaaa 4380
gaacatattc tgaaaggaga catcttccaa gctgttccct ctcaaagggt agccaggccg 4440
acctcattgc acccttcaa catctatcgt catttgacaa ctgtcaatcc ttctccatac 4500
atgttctata ttgactatct agacttccaa gttgttggtg cttcacctga attactagtt 4560
aaatccgaca caacaacaa aatcatcaca catcctattg ctggaactct tcccagaggt 4620
aaaactatcg aagaggacga caattatgct aagcaattga agtcgtcttt gaaagacagg 4680
gccgagcacg tcatgctggt agatttggcc agaaatgata ttaaccgtgt gtgtgagccc 4740
accagtacca cggttgatcg tttattgact gtggagagat tttctcatgt gatgcatctt 4800
gtgtcagaag tcagtggaac attgagacca aacaagactc gcttcgatgc tttcagatcc 4860
attttcccag caggaaccgt ctccggtgct ccgaaggtaa gagcaatgca actcatagga 4920
gaattggaag gagaaaagag aggtgtttat gcggggggccg taggacactg gtcgtacgat 4980
ggaaaatcga tggacacatg tattgcctta agaacaatgg tcgtcaagga ggtgtcgct 5040
taccttcaag ccggaggtgg aattgtctac gattctgacc cctatgacga gtacatcgaa 5100
accatgaaca aaatgagatc caacaataac accatcttgg aggctgagaa aatctggacc 5160
gataggttgc ccagagacga gaatcaaagt gaatccgaag aaaacgatca atgaacggag 5220
gacgtaagta ggaatttatg gttttggccat aatggcctag cttggcgtaa tcatggtcat 5280
agctgtttcc tgtgtgaaat tgttatccgc tcacaattcc acacaacata cgagccggaa 5340
gcataaagtg taaagcctgg ggtgcctaat gagtgagcta actcacatta attgcgttgc 5400
gctcactgcc cgctttccag tcgggaaacc tgtcgtgcca gctgcattaa tgaatcggcc 5460
aacgcgcggg gagaggcggt ttgcgtattg ggcgctcttc cgcttcctcg ctcactgact 5520
cgctgcgctc ggtcgttcgg ctgcggcgag cggtatcagc tcactcaaag gcggtaatac 5580
ggttatccac agaatcaggg gataacgcag gaaagaacat gtgagcaaaa ggccagcaaa 5640
aggccaggaa ccgtaaaaag gccgcgttgc tggcgttttt ccataggctc cgcccccctg 5700
acgagcatca caaaaatcga cgctcaagtc agaggtggcg aaacccgaca ggactataaa 5760
gataccaggc gtttcccct ggaagctccc tcgtgcgctc tcctgttccg accctgccgc 5820
ttaccggata cctgtccgcc tttctccctt cgggaagcgt ggcgctttct catagctcac 5880
gctgtaggta tctcagttcg gtgtaggtcg ttcgctccaa gctgggctgt gtgcacgaac 5940
cccccgttca gcccgaccgc tgcgccttat ccggtaacta tcgtcttgag tccaacccgg 6000
taagacacga cttatcgcca ctggcagcag ccactggtaa caggattagc agagcgaggt 6060
atgtaggcgg tgctacagag ttcttgaagt ggtggcctaa ctacggctac actagaagga 6120
cagtatttgg tatctgcgct ctgctgaagc cagttacctt cggaaaaaga gttggtagct 6180
cttgatccgg caaacaaacc accgctggta gcggtggttt ttttgtttgc aagcagcaga 6240
ttacgcgcag aaaaaaagga tctcaagaag atcctttgat cttttctacg gggtctgacg 6300
ctcagtggaa cgaaaactca cgttaaggga ttttggtcat gagattatca aaaaggatct 6360
tcacctagat ccttttaaat taaaaatgaa gttttaaatc aatctaaagt atatatgagt 6420
aaacttggtc tgacagttac caatgcttaa tcagtgaggc acctatctca gcgatctgtc 6480
tatttcgttc atccatagtt gcctgactcc ccgtcgtgta gataactacg atacgggagg 6540
gcttaccatc tggccccagt gctgcaatga taccgcgaga cccacgctca ccggctccag 6600
atttatcagc aataaaccag ccagccgaa gggccgagcg cagaagtggt cctgcaactt 6660
tatccgcctc catccagtct attaattgtt gccgggaagc tagagtaagt agttcgccag 6720
ttaatagttt gcgcaacgtt gttgccattg ctacaggcat cgtggtgtca cgctcgtcgt 6780
ttggtatggc ttcattcagc tccggttccc aacgatcaag gcgagttaca tgatcccca 6840
tgttgtgcaa aaaagcggtt agctccttcg gtcctccgat cgttgtcaga agtaagttgg 6900
ccgcagtgtt atcactcatg gttatggcag cactgcataa ttctcttact gtcatgccat 6960
ccgtaagatg cttttctgtg actggtgagt actcaaccaa gtcattctga gaatagtgta 7020
tgcggcgacc gagttgctct tgcccggcgt caatacggga taataccgcg ccacatagca 7080
gaactttaaa agtgctcatc attggaaaac gttcttcggg gcgaaaactc tcaaggatct 7140
taccgctgtt gagatccagt tcgatgtaac ccactcgtgc acccaactga tcttcagcat 7200
cttttacttt caccagcgtt tctgggtgag caaaaacagg aaggcaaaat gccgcaaaaa 7260
agggaataag ggcgacacgg aaatgttgaa tactcatact cttccttttt caatattatt 7320
gaagcattta tcagggttat tgtctcatga gcggatacat atttgaatgt atttagaaaa 7380
ataaacaaat aggggttccg cgcacatttc cccgaaaagt gccacctgac gtctaagaaa 7440
ccattattat catgacatta acctataaaa ataggcgtat cacgaggccc tttcgtctcg 7500
cgcgtttcgg tgatgacggt gaaaacctct gacacatgca gctcccggag acggtcacag 7560
cttgtctgta gcggatgcc gggagcagac aagcccgtca gggcgcgtca gcgggtgttg 7620
gcgggtgtcg ggctggctt aactatgcgg catcagagca gattgtactg agagtgcacc 7680
atatgcggtg tgaaataccg cacagatgcg taaggagaaa ataccgcatc aggcgccatt 7740
cgccattcag gctgcgcaac tgttgggaag ggcgatcggt gcgggcctct tcgctattac 7800
gccagctggc gaaaggggga tgtgctgcaa ggcgattaag ttgggtaacg ccagggtttt 7860
cccagtcacg acgttgtaaa acgacggcca gtgaattg                        7898

SEQ ID NO: 8            moltype = DNA   length = 10763
FEATURE                 Location/Qualifiers
misc_feature            1..10763
                        note = Synthetic
source                  1..10763
                        mol_type = other DNA
                        organism = synthetic construct
SEQUENCE: 8
cgcggggat ctcccatgtc tctactggtg gtggtgcttc tttggaatta ttggaaggta   60
aggaattgcc aggtgttgct ttcttatccg aaaagaaata aattgaattg aattgaaatc  120
gtagatcaat tttttttcttt tctctttccc catcctttac gctaaaataa tagtttattt  180
tattttttga atattttta tttatatacg tatatataga ctattattta tcttttaatg  240
attattaaga ttttttattaa aaaaaaattc gctcctctctt taatgccttt atgcagtttt  300
tttttcccat tcgatatttc tatgttcggg ttcagctgtat tttaagttta ataactcgaa  360
aattctgcgt tcgttaaagc ttggcgtaat catggtcata gctgtttcct gtgtgaaatt  420
gttatccgct cacaattcca cacaacatac gagccggaag cataaagtgt aaagcctggg  480
```

```
gtgcctaatg agtgagctaa ctcacattaa ttgcgttgcg ctcactgccc gctttccagt    540
cgggaaacct gtcgtgccag agcttcgtaa ccgacagttt ctaactttg tgctttgaca    600
agaacttctt cttcttgctt taataaaaac tgttccattt tcgttgtata acttgaatca    660
taagcgccaa gcagtctgac agccaacagc gcagcgttcg tactattatt aatagcgacg    720
gtagctactg gaacacctct aggcatttgc acaattgaat gtaaagaatc tactccatct    780
agacaagaac cttttacggg cacaccgatg acaggaagtg gtgtcattgc agccaccata    840
cctggcaagt gagcagcccc accagctcca gcgataattg ttttaattcc acgcttgctt    900
gcggaaatag catatgctga catcctatgt ggagttctat gagcagagac tattgtcact    960
tcaaatggaa cgccaaaatc ttttaaaacc gcacatgcgg cagacattac cggcaagtca   1020
gagtctgatc ccatgatgat tccaaccaat ggtttgacca ttgcttccaa gtccaacttt   1080
tgagcgacag agattttgat tggaatatca gttctacctg taatgtagtt cagcctttgt   1140
tcacattccg cctactgga ggcaataata tttatgtgac ctactttct gttaggtcta   1200
gactcttttc catataagta cactgaggaa cctggagtcg ccaatgctct ttcgcaagtt   1260
tctagctctt tatcttttgt atgttgtct ccaagaacat ttagcataat ggcgttcgtt   1320
gtaatggtgg agaaagatgt gaaattcttt ggcattggca aatccaatat tgatctcaaa   1380
tgagcttcaa attgagaagt gacgcaagca tcaatggtat aatgtccaga gttgtgaggc   1440
cttggggcaa tttcgttaat aagcaattcc cctgttctta aatagaacat ttccacacca   1500
aatataccac aaccgggaaa agatttgatt gcattttctg ccaacaactt cgccttaagt   1560
tgaacggagt ccggaactct agcaggcgca taacataagt cacaaatatt gtccttgtgg   1620
atagtctcta caattgggta agaaaacact aaaccgttaa cagatctcac aatcatgact   1680
gctaattctt tagtaaatgg tgcccatttt tcggcgtaca aaggacgatc cttcagtact   1740
tccaaagctt ccggaatcat ttccttattc tttacaacga agttacctct tccatcgtat   1800
gccaaagtcc tcgacttcaa gacgaatgga aaacccaaat ctcttccaac attcaatagg   1860
gacgtctcac tggcttgttc cacaggaaca ctttgggtaa ctgctatacc atttttgatt   1920
aaatgctctt tttgaatata tttgtcttgt atcaatctga ttgtttctgg agaagggtaa   1980
attttttaatt tgggatgttt tacttgaaga ttctttagtt taggaacatc aaacatgctca   2040
atctcaatcg ttagcacatc acattttca gctagttttt cgatatcaag aggattggaa   2100
aaggagccat taacgtggtc attggagttg cttatttgtt tggcaggaga attttcagca   2160
tctagtatta ccgtcttaat gttgagcctg tttgctgcct caacaatcat acgtcccaat   2220
tgtccccctc ctaatatacc aactgttcta gaatccatac ttgattgttt tgtccgattt   2280
tcttgttttt cttgattgtt atagtaggat gtacttagaa gagagatcca acgattttac   2340
gcaccaattt atacatgaaa tgctccataa tattgtccat ttagttctta ataaaaggtc   2400
agcaagagtc aatcacttag tattacccgg ttcgtagcca tgcaacaaga gtcatttgtc   2460
agcatagctg taataatcaa tcatgacgta agaaatgtat cataattaaa agttgttaaa   2520
gatgtcagtg ttatgttggt gttacaaaat tctcggcttc tcactaatat ttaatatctc   2580
ttaaattta tctgtctttg attcttttaa gaaaagttat gtattattca agaaaaagtc   2640
aattccgcat caaaaggtaa aatttatata aactgcttta aaatttcatg aaactaggca   2700
acttttcgaa atgatctttt tcgagcatga agtttctttt ataataacct ggtcaaaagc   2760
tctgcattaa tgaatcggcc aacgcgcggg gagaggcggt ttgcgtattg ggcgctcttc   2820
cgcttcctcg ctcactgact cgctgcgctc ggtcgttcgg ctgcggcgag cggtatcagc   2880
tcactcaaag gcggtaatac ggttatccac agaatcaggg gataacgcag gaaagaacat   2940
gtgagcaaaa ggccagcaaa aggccaggaa ccgtaaaaag gccgcgttgc tggcgttttt   3000
ccataggctc cgcccccctg acgagcatca caaaaatcga cgctcaagtc agaggtgggc   3060
aaacccgaca ggactataaa gataccaggc gtttccccct ggaagctccc tcgtgcgctc   3120
tcctgttccg accctgccgc ttaccggata cctgtccgcc tttctccctt cgggaagcgt   3180
ggcgctttct catagctcac gctgtaggta tctcagttcg gtgtaggtcg ttcgctccaa   3240
gctgactcgt gtgcacgaac ccccccgttca gcccgaccgc tgcgccttat ccggtaacta   3300
tcgtcttgag tccaacccgg taagacacga cttatcgcca ctggcagcag ccactggtaa   3360
caggattagc agagcgaggt atgtaggcgg tgctacagag ttcttgaagt ggtggcctaa   3420
ctacggctac actagaagaa cagtatttgg tatctgcgct ctgctgaagc cagttacctt   3480
cggaaaaaga gttggtagct cttgatccgg caaacaaacc accgctggta gcggtggttt   3540
ttttgtttgc aagcagcaga ttacgcgcag aaaaaaagga tctcaagaag atcctttgat   3600
cttttctacg gggtctgacg ctcagtggaa cgaaaactca cgttaaggga ttttggtcat   3660
gagattatca aaaaggatct tcacctagat ccttttaaat taaaaatgaa gttttaaatc   3720
aatctaaagt atatatgagt aaacttggtc tgacagttac caatgcttaa tcagtgaggc   3780
acctatctca gcgatctgtc tatttcgttc atccatagtt gcctgactcc ccgtcgtgta   3840
gataactacg atacgggagg gcttaccatc tggccccagt gctgcaatga taccgcgaga   3900
cccacgctca ccggctccag atttatcagc aataaaccag ccagccggaa gggccgagcg   3960
cagaagtggt cctgcaactt tatccgcctc catccagtct attaattgtt gccgggaagc   4020
tagagtaagt agttcgccag ttaatagttt cgcaacgttg ttgccattg ctacaggcat   4080
cgtggtgtca cgctcgtcgt ttggtatggc ttcattcagc tccggttccc aacgatcaag   4140
gcgagttaca tgatccccca tgttgtgcaa aaaagcggtt agctccttcg gtcctccgat   4200
cgttgtcaga agtaagttgg ccgcagtgtt atcactcatg gttatggcag cactgcataa   4260
ttctcttact gtcatgccat ccgtaagatg cttttctgtg actggtgagt actcaaccaa   4320
gtcattctga gaatagtgta tgcggcgacc gagttgctct tgcccggcgt caatacggga   4380
taataccgcg ccacatagca gaactttaaa agtgctcatc attggaaaac gttcttcggg   4440
gcgaaaactc tcaaggatct taccgctgtt gagatccagt tcgatgtaac ccactcgtgc   4500
acccaactga tcttcagcat cttttacttt caccagcgtt tctgggtgag caaaaacagg   4560
aaggcaaaat gccgcaaaaa agggaataag ggcgacacgg aaatgttgaa tactcatact   4620
cttccttttt caatattatt gaagcattta tcagggttat tgtctcatga gcggatacat   4680
atttgaatgt atttagaaaa ataaacaaat aggggttccg cgcacatttc cccgaaaagt   4740
gccacctgac gtcaagaaaa ccattattat catgacatta acctataaaa ataggcgtat   4800
cacgaggccc tttcgtctcg cgcgtttcgg tgatgacggt gaaaacctct gacacatgca   4860
gctcccggag acggtcacag cttgtctgta agcggatgcc gggagcagac aagcccgtca   4920
gggcgcgtca gcgggtgttg gcgggtgtcg gggctggctt aactatgcgg catcagagca   4980
gattgtactg agagtgcacc atatgcggtg tgaaataccg cacagatgcg taaggagaaa   5040
ataccgcatc aggcgccatt cgccattcag gctgcgcaac tgttgggaag ggcgatcggt   5100
gcgggcctct tcgctattac gccagctggc gaaagggggga tgtgctgcaa ggcgattaag   5160
ttgggtaacg ccagggtttt cccagtcacg acgttgtaaa acgacggcca gtgaattaat   5220
```

-continued

```
tccacggact atagactata ctagtatact ccgtctactg tacgatacac ttccgctcag   5280
gtccttgtcc tttaacgagg ccttaccact cttttgttac tctattgatc cagctcagca   5340
aaggcagtgt gatctaagat tctatcttcg cgatgtagta aaactagcta gaccgagaaa   5400
gagactagaa atgcaaaagg cacttctaca atggctgcca tcattattat ccgatgtgac   5460
gctgcagctt ctcaatgata ttcgaatacg ctttgaggag atacagccta atatccgaca   5520
aactgtttta cagatttacg atcgtacttg ttacccatca ttgaattttg aacatccgaa   5580
cctgggagtt ttccctgaaa cagatagtat atttgaacct gtataataat atatagtcta   5640
gcgctttacg gaagacaatg tatgtatttc ggttcctgga gaaactattg catctattgc   5700
ataggtaatc ttgcacgtcg catcccggt tcatttctg cgttccatc ttgcacttca   5760
atagcatatc tttgttaacg aagcatctgt gcttcatttt gtagaacaaa aatgcaacgc   5820
gagagcgcta attttcaaa caaagaatct gagctgcatt tttacagaac agaaatgcaa   5880
cgcgaaagcg ctattttacc aacgaagaat ctgtgcttca tttttgtaaa acaaaaatgc   5940
aacgcgagag cgctaatttt tcaaacaaag aatctgagct gcattttac agaacagaaa   6000
tgcaacgcga gagcgctatt ttaccaacaa agaatctata cttcttttt gttctacaaa   6060
aatgcatccc gagagcgcta tttttctaac aaagcatctt agattacttt ttttctcctt   6120
tgtgcgctct ataatgcagt ctcttgataa cttttttgcac tgtaggtccg ttaaggttag   6180
aagaaggcta ctttggtgtc tattttctct tccataaaaa aagcctgact ccacttcccg   6240
cgtttactga ttactagcga agctgcgggt gcattttttc aagataaagg catccccgat   6300
tatattctat accgatgtgg attgcgcata ctttgtgaac agaaagtgat agcgttgatg   6360
attcttcatt ggtcagaaaa ttatgaacgg ttttcttctat tttgtctcta tatactacgt   6420
ataggaaatg tttacatttt cgtattgttt tcgattcact ctatgaatag ttcttactac   6480
aattttttg tctaaagagt aatactagag ataaacataa aaaatgtgaa ggtcgagttt   6540
agatgcaagt tcaaggagcg aaaggtggat gggtaggtta tatagggata tagcacagag   6600
atatatagca aagagatact tttgagcaat gtttgtggaa gcggtattcg caatatttta   6660
gtagctcgtt acagtccggt gcgttttgg tttttgaaa gtgcgtcttc agagcgcttt   6720
tggttttcaa aagcgctctg agttcctat acttctaga gaataggaac ttcgaaatag   6780
gaacttcaaa gcgtttccga aaacgagcgc ttccgaaaat gcaacgcgag ctgcgcacat   6840
acagctcact gttcacgtcg caccctatatc tgcgtgttgc ctgtatatat atatacatga   6900
gaagaacggc atagtgcgtg tttatgctta aatgcgtact tatatgcgtc tatttatgta   6960
ggatgaaagg tagtctagta cctcctgtga tattatccca ttccatgcgg ggtatcgtat   7020
gcttccttca gcactaccct ttagctgttc tatatgctgc cactcctcaa ttggattagt   7080
ctcatccttc aatgctatca tttccttga tattggatca tatgcatagt accgagaaac   7140
tagtgcgaag tagtgatcag gtattgctgt tatctgatga gtacgttg tcctggccac   7200
ggcagaagca cgcttatcgc tccaatttcc cacaacatta gtcaactccg ttaggccctt   7260
cattgaaaga aatgaggtca tcaaatgtct tccaatgtga gattttgggc catttttat   7320
agcaaagatt gaataaggcg cattttctt caaagcttta ttgtacgatc tgactaagtt   7380
atcttttaat aattggtatt cctgtttatt gcttgaagaa ttgccggtcc tatttactcg   7440
ttttaggact ggttcagaat taattctcat gttgacagc ttatcatcgc gataagcttt   7500
tcaattcatc attttttt tattctttt tttgatttcg gtttccttga aattttttg   7560
attcggtaat ctccgaacag aaggaagaac gaaggaagga gcacagactt agattgggtat   7620
atatacgcat atgtagtgtt gaagaaacat gaaattgccc agtattctta acccaactgc   7680
acagaacaaa aacctgcagg aaacgaagat aaatcatgtc gaaagctaca tataaggaac   7740
gtgctgctac tcatcctagt cctgttgctg ccaagctatt taatatcatg cacgaaaagc   7800
aaacaaactt gtgtgcttca ttggatgttc gtaccaccaa ggaattactg gagttagttg   7860
aagcattagg tcccaaaatt tgtttactaa aaacacatgt ggatatcttg actgattttt   7920
ccatggaggg cacagttaag ccgctaaagg cattatccgc caagtacaat ttttactct   7980
tcgaagacag aaaatttgct gacattggta atacagtcaa attgcagtac tctgcgggtg   8040
tatacagaat agcagaatgg gcagacatta cgaatgcaca cggtgtggtg ggcccagta   8100
ttgttagcgg tttgaagcag gcggcagaag aagtaacaaa ggaacctaga ggcctttga   8160
tgttagcaga attgtcatgc aagggctccc tatctactgg agaatatact aagggtactg   8220
ttgacattgc gaagagcgac aaagattttg ttatcggctt tattgctcaa agagacatgg   8280
gtggaagaga tgaaggttac gattggttga ttatgacacc cggtgtgggt ttagatgaca   8340
agggagcgc attgggtcaa cagtatagaa ccgtggatga tgtggtctct acaggatctg   8400
acattattat tgttggaaga ggactatttg caaagggaag ggatgctaag gtagagggtg   8460
aacgttacag aaaagcaggc tgggaagcat atttgagaag atgcggccag caaaactaaa   8520
aaactgtatt ataagtaaat gcatgtatac taaactcaca aattagagct tcaatttaat   8580
tatatcagtt attacccgat caaaaatcat cgcttcgctg attaattacc ccagaaataa   8640
ggctaaaaaa ctaatcgcat tatcatccta tggttgttaa tttgattcgt tcatttgaag   8700
gtttgtgggg ccaggttact gccaattttt cctcttcata accataaaag ctagtattgt   8760
agaatcttta ttgttcggag cagtgcggcg cgaggcacat ctgcgtttca ggaacgcgac   8820
cggtgaagac gaggacgcac ggaggagagt cttccttcgg agggctgtca cccgctcggc   8880
ggcttctaat ccgtacttca atatagcaat gagcagttaa gcgtattact gaaagttcca   8940
aagagaaggt ttttttaggc taatcgacct cgagcagatc cgccaggcgt gtatatagcg   9000
tggatggcca ggcaacttta gtgctgacac atacaggcat atatatgt gtgcgacgac   9060
acatgatcat atggcatgca tgtgctctgt atgtatataa aactcttgtt ttcttcttt   9120
ctctaaatat tctttcctta tacattaggc cctttgtagc ataaattact atacttctat   9180
agacacgcaa acacaaatac acacactaaa ttaccggatc catggagcaa gctcaatggg   9240
tcgacccaac tctgctccct gcatttgtgg gcatcatctt cttcttcctt ggcatgttct   9300
ttggaaggag ttctttggga gctgggaagg gtgcagcgcc tagaagcacc agttctaccg   9360
agtggccaga cggccctcca aagctgccca tcatcggcaa cctgcaccag ctcaacaaag   9420
gcggggagct ggtccaccac aacctcgcca agctcgccca gtcctacgac cgcgccatga   9480
ccatctgggt cggcagctgg ggccccatga tcgtcgtcag cgacgccgac cttgcatggg   9540
aggtcctcgt caccaagtcg ccggacttcg ccggccgggt gctctccaag ctctcgcact   9600
tgttcaacgc caactacaac accgtcgtcg cctacggcga tgccagcgc   9660
tccggcgagg tctgcagcac gggccgctcg gccccgccca tgtttctgcg caggctcgtt   9720
tccacgaaga agacatgaag ctcctggtga gcgacatgat gagagcagca cagaaagtg   9780
gtagcaatgg agtggttgaa cctctggcct atgtccggcg agccactatc cgatttctgt   9840
ctcgtctatg ctttggggag gccttcaacg acgaggcgtt cgtggagggg atggacgaag   9900
cagtggagga gaccatcgga gccactggcc atgcacgcat cctcgacgcc ttctacttca   9960
```

-continued

```
ctcgccacct ccctatcatc cgccgcagct tcatagatac cgtcaacgcc aagaagaaga    10020
tcgagagcct tgtccggccg ttgctctccc ggccggcgcc accggggtct tacctccact    10080
tcctcctttc caccgacgcg ccggagaata tgatcatctt tcgaatattc gaagtctact    10140
tgctgggcgt ggacagcacc gcctccacca ccacatgggc tctcgccttc ctcgtctcca    10200
accaacaggc gcaggagaag ctccacaatg agctcgcca gtactgcgcc agccagaaca     10260
atcagatcat caaagcagac gacgtcggaa agctgtcgta cctgctcggg gtagtgaagg    10320
agacgatgag gatgaagccg atagcgccgc tggccgtccc ccacaagacg ctcaaggaga    10380
cgatgctcga cggaaagagg gtggcggcgg aacgacggt ggtagtgaac ctctatgccg      10440
tccactacaa cccgaagcta tggccggagc cggagcagtt ccgcccggag aggttcgtgg    10500
tcggcgccag cggcggcaat ggtgggggt cttccgagca catgctgcag tcgtacctgg      10560
cctttggagg ggggatgagg tcctgcgcag ggatggaggt gggaaagttg caggtggcga    10620
tggtcgtggc caaccttgtg atggcattta aatggttgcc ggaggaggag gggaagatgc    10680
cggacctggc tgaagacatg accttcgtgc tcatgatgaa gaagccattg gctgccaaaa    10740
tcgttccacg tgcatgagaa ttc                                             10763
```

SEQ ID NO: 9        moltype = DNA  length = 5024
FEATURE         Location/Qualifiers
misc_feature    1..5024
                 note = Synthetic
source          1..5024
                 mol_type = other DNA
                 organism = synthetic construct
SEQUENCE: 9

```
atgtaagtta gctcactcat taggcacccc aggctttaca ctttatgctt ccggctcgta    60
taatgtgtgg aattgtgagc ggataacaat ttcacacagg aaacaggatc gatccatcga    120
tgagcttact ccccatcccc ctgttgacaa ttaatcatcg gctcgtataa tgtgtggaat    180
tgtgagcgga taacaatttc acacaggaaa caggatcagc ttactcccca tcccctgtt    240
gacaattaat catcggctcg tataatgtgt ggaattgtga gcggataaca atttcacaca    300
ggaaacagga tccatcgatg cttaggaggt catttccgct tggcggtatt ccttcaccta    360
gcactctcga gcaccaccac caccaccact aataagaatt catcgatgat aagctgtcaa    420
acatgagcag atctgagccc gcctaatgag cgggcttttt tttcagatct gcttgaagac    480
gaaagggcct cgtgatacgc ctatttttat aggttaatgt catgataata atggtttctt    540
agacgatgcg tcaaagcaac catagtacgc gccctgtagc ggcgcattaa gcgcggcggg    600
tgtggtggtt acgcgcagcg tgaccgctac acttgccagc gccctagcgc ccgctccttt    660
cgctttcttc ccttcctttc tcgccacgtt cgccggcttt ccccgtcaag ctctaaatcg    720
ggggctccct ttagggttcc gatttagagc tttacggcac ctcgacccca aaaaacttga    780
tttgggtgat ggttcacgta gtgggccatc gccctgatag acggttttc gccctttgac    840
gttggagtcc acgttcttta atagtggact cttgttccaa actggaacaa cactcaaccc    900
tatctcgggc tattctttg attataagg gattttgccg atttcggcct attggttaaa    960
aaatgagctg atttaacaaa aatttaacgc gaatttaac aaaatattaa cgtttacaat    1020
ttcatcgtca ggtggcactt tcggggaaa tgtgcgcgga acccctattt gtttattttt    1080
ctaaatacat tcaaatatgt atccgctcat gagacaataa ccctgataaa tgcttcaata    1140
atattgaaaa aggaagagta tgagtattca acatttccgt gtcgccctta ttcccttttt    1200
tgcggcattt tgccttcctg ttttttgctca cccagaaacg ctggtgaaag taaaagatgc    1260
tgaagatcag ttgggtgcac gagtgggtta catcgaactg gatctcaaca gcggtaagat    1320
ccttgagagt tttcgccccg aagaacgttt tccaatgatg agcacttta aagttctgct    1380
atgtggcgcg gtattatccc cgtgttgacgc cgggcaagca caactcggtc gccgcataca    1440
ctattctcag aatgacttgg ttgagtactc accagtcaca gaaaagcatc ttacggatgg    1500
catgacagta agagaattat gcagtgctgc cataaccatg agtgataaca ctgcggccaa    1560
cttacttctg acaacgatcg gaggaccgaa ggagctaacc gcttttttgc acaacatggg    1620
ggatcatgta actcgcttg atcgttggga accggagctg aatgaagcca taccaaacga    1680
cgagcgtgac accacgatgc ctgcagcaat ggcaacaacg ttgcgcaaac tattaactgg    1740
cgaactactt actctagctt cccggcaaca attaatagac tggatggagg cggataaagt    1800
tgcaggacca cttctgcgct cggcccttcc ggctggctgg tttattgctg ataaatctgg    1860
agccggtgag cgtgggtctc gcggtatcat tgcagcactg gggccagatg gtaagccctc    1920
ccgtatcgta gttatctaca cgacggggag tcaggcaact atggatgaac gaaatagaca    1980
gatcgctgag ataggtgcct cactgattaa gcattggtaa ctgtcagacc aagtttactc    2040
atatatactt tagattgatt taaaacttca ttttttaatt taaaaggatct aggtgaagat    2100
ccttttttgat aatctcatga ccaaaatccc ttaacgtgag ttttcgttcc actgagcgtc    2160
agacccgta gaaagatca aggatcttc ttgagatcct ttttttctgc gcgtaatctg      2220
ctgcttgcaa acaaaaaaac caccgctacc agcggtggtt tgtttgccgg atcaagagct    2280
accaactctt tttccgaagg taactggctt cagcagagcg cagataccaa atactgtcct    2340
tctagtgtag ccgtagttag gccaccactt caagaactct gtagcaccgc ctacatacct    2400
cgctctgcta atcctgttac cagtgctgc tgccagtggc gataagtcgt gtcttaccgg    2460
gttggactca agacgatagt taccggataa ggcgcagcgg tcgggctgaa cggggggttc    2520
gtgcacacag cccagcttgg agcgaacgac ctacaccgaa ctgagatacc tacagcgtga    2580
gctatgagaa agcgccacgc ttcccgaagg agaaaggcg acaggtatcc ggtaagcgg     2640
cagggtcgga acaggagagc gcacgaggga gcttccaggg gaaacgcct ggtatctttaa     2700
tagtcctgtc gggtttcgcc acctctgact tgagcgtcga tttttgtgat gctcgtcagg    2760
ggggcggagc ctatgaaaa acgccagcaa cgcggccttt ttacggttcc tggccttttg    2820
ctggcctttt gctcacatgt tctttcctgc gttatcccct gattctgtgg ataaccgtat    2880
taccgccttt gagtgagctg ataccgctcg ccgcagccga acgaccgagc gcagcgagtc    2940
agtgagcgag gaagcggaag agcgcctgat gcggtatttt ctccttacgc atctgtgcgg    3000
tatttcacac cgcataatgg tgcactctca gtacaatctg ctctgatgcc gcatagttaa    3060
gccagtatac actccgctat cgctacgtga ctgggtcatg gctgcgcccc gacacccgcc    3120
aacacccgct gacgcgccct gacgggcttg tctgctcccg gcatccgctt acagacaagc    3180
tgtgaccgtc tccgggagct gcatgtgtca gaggttttca ccgtcatcac cgaaacgcgc    3240
gaggcagaac gccatcaaaa ataattcgcg tctggccttc ctgtagccag cttttcatcaa    3300
cattaaatgt gagcgagtaa caaccgcgcg gattctccgt gggaacaaac ggcggattga    3360
```

-continued

```
cgtaatggg ataggtcacg ttggtgtaga tgggcgcatc gtaaccgtgc atctgccagt    3420
ttgaggggac gacgacagta tcggcctcag gaagatcgca ctccagccag ctttccggca    3480
ccgcttctgg tgccggaaac caggcaaagc gccattcgcc attcaggctg cgcaactgtt    3540
gggaagggcg atcggtgcgg gcctcttcgc tattacgcca gctggcgaaa ggggatgtg     3600
ctgcaaggcg attaagttgg gtaacgccag ggttttccca gtcacgacgt tgtaaaacga    3660
cggccagtga atccgtaatc atggtcatag ctgtttcctg tgtgaaattg ttatccgctc    3720
acaattccac acattatacg agccggaagc ataaagtgta aagcctgggg tgcctaatga    3780
gtgagctaac ttacattaat tgcgttgcgc tcactgcccg ctttccagtc gggaaacctg    3840
tcgtgccagc tgcattaatg aatcggccaa cgcgcgggga gaggcggttt gcgtattggg    3900
cgccagggtg gtttttcttt tcaccagtga cgggcaac agctgattgc ccttcaccgc      3960
ctggccctga gagagttgca gcaagcggtc cacgctggtt tgcccagca ggcgaaaatc     4020
ctgtttgatg tggttaacg gcgggatata acatgagctg tcttcggtat cgtcgtatcc     4080
cactaccgag atatccgcac caacgcgcag cccggactcg gtaatggcgc gcattgcgcc    4140
cagcgccatc tgatcgttgg caaccagcat cgcagtggga acgatgccct cattcagcat    4200
ttgcatggtt tgttgaaaac cggacatggc actccagtcg ccttcccgtt ccgctatcgg    4260
ctgaatttga ttgcgagtga gatatttatg ccagccagcc agacgcagac gcgccgagac    4320
agaacttaat gggcccgcta acagcgcgat ttgctgtga cccaatgcga ccagatgctc     4380
cacgcccagt cgcgtaccgt cttcatggga gaaaataata ctgttgatgg gtgtctggtc    4440
agagacatca agaaataacg ccggaacatt agtgcaggca gcttccacag caatggcatc    4500
ctggtcatcc agcggatagt taatgatcag cccactgacg cgttgcgcga aagattgtg     4560
caccgccgct ttacaggctt cgacgccgct tcgttctacc atcgacacca ccacgctggc    4620
acccagttga tcggcgcgag atttaatcgc cgcgacaatt cggttacgcc cgtgcagggc    4680
cagactggag gtggcaacgc caatcagcaa cgactgtttg cccgccagtt gttgtgccac    4740
gcggttggga atgtaattca gctccgccat cgccgcttcc actttttccc gcgttttcgc    4800
agaaacgtgg ctggcctggt tcaccacgcg ggaaacggtc tgataagaga caccggcata    4860
ctctgcgaca tcgtataacg ttactggttt cacattcacc accctgaatt gactctcttc    4920
cgggcgctat catgccatac cgcgaaaggt tttgcaccat tcgatggtgt cctggcacga    4980
caggtttccc gactggaaag cgggcagtga gcgcaacgca atta                     5024
```

| SEQ ID NO: 10 | moltype = DNA length = 6164 |
|---|---|
| FEATURE | Location/Qualifiers |
| misc_feature | 1..6164 |
| | note = Synthetic |
| source | 1..6164 |
| | mol_type = other DNA |
| | organism = synthetic construct |

SEQUENCE: 10

```
ggtctcaccc tgaattcgca tctagatggt agagccacaa acagccggta caagcaacga    60
tctccaggac catctgaatc atgcgcggat gacacgaact cacgacggcg atcacagaca    120
ttaacccaca gtacagacac tgcgacaacg tggcaattcg tcgcaatacc gtctcactga    180
actggccgat aattgcagac gcagttcgag tttatcatta tcaatactgc catttcaaag    240
aatacgtaaa taattaatag tagtgatttt cctaacttta tttagtcaaa aaattagcct    300
tttaattctg ctgtaacccg tacatgccca aaatagggcg ggttacac agaatatata    360
acatcgtagg tgtctgggtg aacagtttat tcctggcatc cactaaatat aatgagccc    420
gcttttaag ctggcatcca gaaaaaaaa gaatcccagc accaaaatat tgttttcttc     480
accaaccatc agttcatagg tccattctct tagcgcaact acagagaaca ggggcacaaa    540
caggcaaaaa acgggcacaa cctcaatgga gtgatgcaac ctgcctggag taaatgatga    600
cacaaggcaa ttgacccacg catgtatcta tctcattttc ttacaccttc tattaccttc    660
tgctctctct gatttggaaa aagctgaaaa aaaaggttga aaccagttcc ctgaaattat    720
tcccctactt gactaataag tatataaaga cggtaggtat tgattgtaat tctgtaaatc    780
tatttcttaa acttcttaaa ttctactttt atagttagtc ttttttttag tttaaaaca    840
ccaagaactt agtttcgaat aaacacacat aaacaaacaa aagatcatgg ttgaagcatt    900
gacaattgat agagttccag atcatattgc tagagcagtt gttgatccac atgcttatgc    960
agaatgggat ggtttacatg ctatgttggc agaattaaga agagaacatc catttgctag    1020
agcagattttg gaaggttacg aaccatttttg ggttgcttct aaacatgcag atattcaaga    1080
agtttgtaga agacatgatt tgtaccaaaa cggtacttac ttcatcggta caagaaaggt    1140
tttggaatta gaatattcaa ctggtaaagc atctcaagaa agagttattc aagctatgaa    1200
tgcaccagaa cacatgaaat acagaagatt aactcaaggt tggttccaac ctaaaaattt    1260
gagaaaattg gatgaaagat tcagaagaat cgcaagaggt tatgttgatc aaatggttga    1320
attgggtggt gaatgtgaat ttttccatgc tattggtgtt agataccat tgttagttat     1380
tatgtcaatc ttgggttttgc cagatgatgc tgaagccttt atgatgagat tgactcaaaa    1440
cgttacaaac atggatgatg ctgaattgac aggtttacca gctccaaaaa ctgcagaaga    1500
aagagcacaa agatcattag caatgtctaa cgaagctaga gtttacttcg atgaattgtc    1560
aaagactaga agagcatctc caactgatga tgtttcaaca ttgatcgcta acgcaacaat    1620
cgaaggtaaa ccaatttctg aaccagatat tttgggttac tacatgactg ttgctattgc    1680
aggtcatgat actacatctg catcattgtc tggtgctatt tgggctttag cagaaagacc    1740
agctgaattg gcaaaagtta aggcagattt gtcattaatc ccaaatttgg ttgaagaagc    1800
tgttagatgg actacaccaa ttactcatttt cttgagaaca gcagttagaa atactgtttt    1860
tagaggtcaa ccaattgcta agggtgacta cgttttgttg tcatacactt ctggtaacag    1920
agatgaagaa gttttcgatg atccattcga gtttaaagtt ggtagaaaga aaaatgaaca    1980
agttgcattc ggttatggtc cacatgtttg ttttgggtcaa catttggcta atggaaat     2040
gaacattttc tttgaagaat tgttgccaag attgaaatct ttggaattag ctggtacacc    2100
acaaagaaag atcacttctt caatgggtgg tccaaaatct gttccaatta gatccaaat    2160
gtcagattac aaggacgata atgataagga ctacaaagat gatgaca aagattataa      2220
ggacgatgat gataaaggtc atcatcatca tcatcactaa ctcgagataa agcaatcttg    2280
atgaggataa tgattttttt ttgaatatac ataaatacta ccgttttttct gctagatttt    2340
gtgatgacgt aaataagtac atattacttt ttaagccaag acaagattaa gcattaactt    2400
taccccttttc tttctaagtt tcaatattag ttatcactgt ttaaaagtta tggcgagaac    2460
gtcggcggtt aaaatatatt accctgaacg gctgtgagac cagtagtgat tttcctaact    2520
```

```
ttatttagtc aaaaaattag cctttaatt ctgctgtaac ccgtacatgc ccaaaatagg 2580
gggcgggtta cacagaatat ataacatcgt aggtgtctgg gtgaacagtt tattcctggc 2640
atccactaaa tataatggag cccgcttttt aagctggcat ccagaaaaaa aaagaatccc 2700
agcaccaaaa tattgttttc ttcaccaacc atcagttcat aggtccattc tcttagcgca 2760
actacagaga acaggggcac aaacaggcaa aaaacgggca caacctcaat ggagtgatgc 2820
aacctgcctg gagtaaatga tgacacaagg caattgaccc acgcatgtat ctatctcatt 2880
ttcttacacc ttctattacc ttctgctctc tctgatttgg aaaaagctga aaaaaaaggt 2940
tgaaaccagt tccctgaaat tattcccta cttgactaat aagtatataa agacggtagg 3000
tattgattgt aattctgtaa atctatttct taaacttctt aaattctact tttatagtta 3060
gtcttttttt tagttttaaa acaccaagaa cttagtttcg aataaacaca cataaacaaa 3120
caaaagatca tggctaaatt gaatgttgtt actagagaag gtcaagaagt tgttttggaa 3180
ggtgaagaag gtttgtctgt tatggaaatc atcagagatg gtggtatcga tgaattgtta 3240
gctttgtgtg gtggttgttg ttcttgtgca acatgtcatg ttcatgttga tccagctttt 3300
gcagataaat taccaccaat ttcagaagat gaaaacgatt tgttagattc ttcagatcat 3360
agaaacgatc aatcaagatt gtcatgtcaa ttgacttttt cagctgaatt ggatggttta 3420
agagttacaa ttgcaccaga agatgattac aaggacgatg atgataagga ctacaaagat 3480
gatgatgaca aagattataa ggacgatgat gataaaggtc atcatcatca tcatcactaa 3540
ctcgagataa agcaatcttg atgaggataa tgatttttt ttgaatatac ataaatacta 3600
ccgtttttct gctagatttt gtgatgacgt aaataagtac atattacttt ttaagccaag 3660
acaagattaa gcattaactt taccctttc tttctaagtt tcaatattag ttatcactgt 3720
ttaaagtta tggcgagaac gtcggcggtt aaaatatatt accctgaacg gctgtgagac 3780
cagtagtgat tttcctaact ttatttagtc aaaaaattag cctttaatt ctgctgtaac 3840
ccgtacatgc ccaaaatagg gggcgggtta cacagaatat ataacatcgt aggtgtctgg 3900
gtgaacagtt tattcctggc atccactaaa tataatggag cccgcttttt aagctggcat 3960
ccagaaaaaa aaagaatccc agcaccaaaa tattgttttc ttcaccaacc atcagttcat 4020
aggtccattc tcttagcgca actacagaga acaggggcac aaacaggcaa aaacgggca 4080
caacctcaat ggagtgatgc aacctgcctg gagtaaatga tgacacaagg caattgaccc 4140
acgcatgtat ctatctcatt ttcttacacc ttctattacc ttctgctctc tctgatttgg 4200
aaaaagctga aaaaaaaggt tgaaaccagt tccctgaaat tattcccta cttgactaat 4260
aagtatataa agacggtagg tattgattgt aattctgtaa atctatttct taaacttctt 4320
aaattctact tttatagtta gtcttttttt tagttttaaa acaccaagaa cttagtttcg 4380
aataaacaca cataaacaaa caaaagatca tggatcatta cgatgttttg atcgttggtg 4440
ctggtcatgg tggtgcacaa gctgcagttt ctttaagaca attgaacttc gaaggttcaa 4500
tcggttttgt aggtgacgaa gctgatccac catacgaaag accaccattg tctaaggaat 4560
acttctcagg tgaaaagact ttcgaaagaa ttttgatcag accagcttct tttgggtg 4620
acagaaacgt ttcattgtta ttgaacagaa gagttactgc tgttgatgtt ccaggtcata 4680
gagttacatt agcagatggt tcttcattat cttacggtaa attgatttgg gctactggtg 4740
gtgcaccaag aagattatca tgtgttggtg gtgacttgaa aggtgttcat ggtgttagaa 4800
caagagttga tgcagatgct atgttgtctg aaatcgaatc agttgaacaa gttgttgtta 4860
ttggtggtgg ttatattggt ttagaagctg cagctgtttt gtctaagttc ggtaaacatg 4920
ttactgtttt ggaagcattg gatagagttt tagcaagagt tgctggtgaa ccattgtcaa 4980
gattctacga aaacgaacat agagcacatg gtgttgatgt tagattgaat gcaatggtta 5040
ctgaaattga gggtaaagat ggtcatgttt ctggtgttaa attgggtgac ggtacaattt 5100
tgccagctca aatggttatt gtcggtatcg gtatcattcc agctgttgaa ccattaattg 5160
cagctggtgc agttggttct aatggtgttg atgttgatga acattgtcaa acatcattgc 5220
cagatatata tgctattggt gactgtgcag ctcatgttaa tggttttgca gctgatgcta 5280
gaattagatt agaatctgtt caaaacgcaa acgatcaagc aactacagct gttaaagcaa 5340
ttgttggtca accacaacca tatcatgctg ttccttggtt ttggtctaat caatacgatt 5400
tgagattgca aactgtggt ttgtcaacag gttttgatga agttgttcaa agaggtgacc 5460
cagcagctag atcattttct atcgtttatt tgagaaatgg taaagttatt gctttggatt 5520
gtgttaacgc agttaaggat tacgttcaag gtagagcttt agttactggt ggtattgcac 5580
cagctaaaga tgcattggct aacccagaaa tcccattgaa gacattggtt ccagcagatt 5640
acaaggacga tgatgataag gactacaaag atgatgatga caaagattat aaggacgatg 5700
atgataaagg tcatcatcat catcatcact aactcgagat aaagcaatct tgatgaggat 5760
aatgattttt tttttgaatat acataaatac taccgttttt ctgctagatt ttgtgatgac 5820
gtaaataagt acatattact ttttaagcca agacaagatt aagcattaac tttacccttt 5880
tctttctaag tttcaatatt agttatcact gtttaaaagt tatggcgaga acgtcggcgg 5940
ttaaaatata ttaccctgaa cggctgtgag accggtctca gctgagcatg agacggaaat 6000
ctgctcgtca gtggtgctca cactgacgaa tcatgtacag atcataccga tgactgcctg 6060
gcgactcaca actaagcaag acagccgaa ccagcgccgg cgaacaccac tgcatatatg 6120
gcatatcaca acagtccaac tagtgcactg cagtacatga gacc 6164
```

ENZYMATIC DEGRADATION OF MYCOTOXINS DURING GRAIN PROCESSING

RELATED APPLICATIONS

This application is a Continuation of U.S. application Ser. No. 17/199,274 titled "Enzymatic Degradation of Mycotoxins During Grain Processing" filed Mar. 11, 2021, which claims the benefit of U.S. Provisional Application No. 62/988,670 titled "Enzymatic Degradation of Mycotoxins During Fermentation and Post-Fermentation" filed Mar. 12, 2020, which are both incorporated herein by reference.

TECHNICAL FIELD

Provided herein are methods, compositions, and genetically modified microorganisms for mitigating mycotoxin contamination of corn and other feedstocks used in bioprocessing and food and feed production.

SEQUENCE LISTING

An official copy of the sequence listing is submitted concurrently with the specification electronically via EFS-Web as an XML formatted sequence listing with a file name of PT-141-US04_Sequence_Listing, a creation date of Nov. 11, 2022, and a size of about 62 kilobytes. The sequence listing contained in this XML formatted document is part of the specification and is herein incorporated by reference in its entirety.

BACKGROUND OF THE INVENTION

Mycotoxins are naturally occurring toxins produced by fungi resulting in contaminated food and feed, especially cereals, forages, grain, fruits, and manufactured products. Mycotoxin contamination is monitored, and increased mycotoxin loading results in lower prices, and/or loss of crops or food products with considerable economic consequences. Consumption of contaminated grains or feeds can result in decreased efficiency in weight gain and reproductivity in livestock. In humans, effects can range from mild gastrointestinal symptoms to liver damage, neurotoxicity, and cancer.

Many common mycotoxins are resistant to most forms of food and feed processing, and in fact, can become more concentrated during processing. For example, as components in the feedstock are separated or consumed the fraction of mycotoxin in the remaining material may increase. In one illustrative example, starch in the feedstock is converted via fermentation to a chemical and $CO_2$ and the fraction of mycotoxin in the remaining unfermented material is greater than it was in the feedstock resulting in higher mycotoxin levels in fermentation by-products such as distillers' dried grains with solubles (DDGS). Processing grains into human foods also results in increased levels of mycotoxins. As such, it is important that mycotoxin contamination is mitigated in foods designed for human consumption and livestock feeds.

The present invention is directed toward overcoming one or more of the problems discussed above.

SUMMARY OF THE INVENTION

Provided herein are methods of mitigating mycotoxin contamination in a feed or food product produced in a dry mill or wet mill grain processing facility. In some aspects, the methods comprise (i) contacting a feedstock or process stream of a dry mill or wet mill grain processing facility with an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin; and (ii) producing a food or feed product from a process stream downstream of said contacting step.

In some aspects, the contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof, with a microorganism expressing the enzyme. In some aspects, the contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof, with a lysate obtained from a microorganism expressing the enzyme.

In some aspects, the contacting comprises contacting the feed stock or process stream with a microorganism expressing an enzyme selected from the group consisting of aflatoxin oxidase, 3-O acetyltransferase, peroxidase, F420H2-dependent reductases, Ery4, UDP-glycosyltransferase , laccase, manganese peroxidase, deoxynivalenol hydroxylase, lactono hydrolase, Zearalenone hydrolase, xylanase, DepA/DepB, and 2cys-peroxiredoxin, a broth containing a such a microorganism, a lysate formed by lysing a such a microorganism, a concentrate of such a microorganism or lysate, or combinations thereof.

In some embodiments, provided herein are grains and compositions sourced from mycotoxin contaminated grains wherein the contaminated grain or compositions are exposed to an enzyme to mitigate mycotoxin contamination. The resulting compositions have decreased levels of mycotoxin relative to compositions not exposed to the enzyme. Exposure to the enzyme can be through exposure to a microorganism expressing an enzyme to mitigate mycotoxin contamination. Exposure to the enzyme can be through exposure to materials obtained from lysing the microorganism which expresses the mycotoxin mitigating enzyme, i.e. a lysate.

In some embodiments, a human food composition sourced from mycotoxin contaminated grain exposed to a mycotoxin mitigating enzyme or a microorganism expressing an enzyme to mitigate mycotoxin contamination is provided. In some aspects, the levels of mycotoxin in the human food composition are decreased relative to the levels of mycotoxin in a human food composition sourced from mycotoxin contaminated grain without exposure to a mycotoxin mitigating enzyme or a microorganism expressing an enzyme to mitigate mycotoxin contamination.

In some embodiments, corn starch sourced from mycotoxin contaminated grain exposed to a mycotoxin mitigating enzyme or a microorganism expressing an enzyme to mitigate mycotoxin contamination is provided. In some aspects, the levels of mycotoxin in the corn starch is decreased relative to the levels of mycotoxin in corn starch sourced from mycotoxin contaminated grain without exposure to a mycotoxin mitigating enzyme or a microorganism expressing an enzyme to mitigate mycotoxin contamination.

In some embodiments, corn syrup sourced from mycotoxin contaminated grain exposed to a mycotoxin mitigating enzyme or a microorganism expressing an enzyme to mitigate mycotoxin contamination is provided. In some aspects, the levels of mycotoxin in the corn syrup is decreased relative to the levels of mycotoxin in corn syrup sourced from mycotoxin contaminated grain without exposure to a mycotoxin mitigating enzyme or a microorganism expressing an enzyme to mitigate mycotoxin contamination.

In some embodiments, a livestock feed composition comprising distiller's grain sourced from feedstock fermented in the presence of an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from a feedstock fermented in the absence of a microorganism expressing an enzyme to mitigate mycotoxin contamination.

In some embodiments, a livestock feed composition comprising distiller's grain sourced from a post-fermentation whole stillage, wet cake, thin stillage and/or concentrated thin stillage (e.g. syrup) stream treated with an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from an untreated post-fermentation whole stillage, wet cake, thin stillage and/or concentrated thin stillage (e.g. syrup) stream.

In some embodiments, a livestock feed composition comprising distiller's grain sourced from beer treated with an enzyme to mitigate mycotoxin contamination or a microorganism expressing an enzyme to mitigate mycotoxin contamination is provided. In some aspects, the levels of mycotoxin in the livestock feed composition are decreased relative to the levels of mycotoxin in a livestock feed composition obtained from untreated beer.

In some aspects, the mycotoxin is selected from the group consisting of aflatoxin, ochratoxin A, patulin, T-2, HT-2, beauvericin, neosolaniol, nivalenol, deoxynivalenol (DON), 3-ADON, 15-ADON, trichothecene, ochratoxin, and zearalenone.

In some aspects, the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, and lactono hydrolase, xylanase, peroxidase, and 2cys-peroxiredoxin. In some aspects, the enzyme can be a combination of enzymes, for example, an enzyme system that works in two or more steps to detoxify a mycotoxin. For example, the enzyme system can be DepA/DepB, where DepA converts DON to 3-keto-DON and DepB, an NADPH dependent dehydrogenase, catalyzes the reduction of 3-keto-DON to 3-epi-DON.

In some aspects, the microorganism is a bacteria. In some aspects, the microorganism is a yeast. In some aspects, the microorganism is engineered to express and/or excrete a mycotoxin mitigating enzyme. In some aspects, the microorganism is a yeast such as *S. cerevisiae* or *Pichia pastoris*. In some aspects, the microorganism is a genetically modified commodity yeast or a genetically modified consolidated bioprocessing yeast, wherein the yeast is genetically modified to express a mycotoxin mitigating enzyme.

In some embodiments, the mycotoxin mitigating enzyme is expressed by a yeast host cell.

In some aspects, the human food composition or the livestock feed composition contains mycotoxins at levels less than about 10 ppm, less than about 8 ppm, less than about 5 ppm, less than about 3 ppm, or less than about 2 ppm.

In some embodiments, a method of producing corn starch is provided. In some aspects, the method comprises inoculating a mycotoxin contaminated corn with one or more yeast strains prior to or during steeping wherein at least one yeast strain expresses a mycotoxin mitigating enzyme. In some aspects, the mycotoxin mitigating enzyme is deoxynivalenol hydroxylase. In some aspects, the method further comprises processing the corn to produce corn starch. In some aspects, the method further comprises processing the corn starch to produce corn syrup.

In some embodiments, a method of producing corn starch is provided. In some aspects, the method comprises exposing a mycotoxin contaminated corn with a lysate obtained from a microorganism expressing a mycotoxin mitigating enzyme prior to or during steeping. In some aspects, the mycotoxin mitigating enzyme is deoxynivalenol hydroxylase. In some aspects, the method further comprises processing the corn to produce corn starch. In some aspects, the method further comprises processing the corn starch to produce corn syrup.

In some embodiments, a method of fermentation is provided. In some aspects, the method comprises inoculating a mycotoxin contaminated feedstock with one or more yeast strains, wherein at least one yeast strain expresses a mycotoxin mitigating enzyme. In some aspects, the mycotoxin mitigating enzyme is deoxynivalenol hydroxylase. The feedstock can be inoculated during yeast propagation and/or can be inoculated during fermentation. In some aspects, the method further comprises fermenting the feedstock to produce ethanol and distiller's grain.

In some embodiments, a method of fermentation is provided. In some aspects, the method comprises exposing a mycotoxin contaminated feedstock with a lysate obtained from a microorganism expressing a mycotoxin mitigating enzyme. In some aspects, the mycotoxin mitigating enzyme is deoxynivalenol hydroxylase. The exposure of the feedstock to the lysate can occur prior to or during fermentation. In some aspects, the method further comprises fermenting the feedstock to produce ethanol and distiller's grain.

In some aspects, the feedstock is contaminated with a mycotoxin, for example, deoxynivalenol. After exposure to the mycotoxin mitigating enzyme, for example, by a microorganism expressing a mycotoxin mitigating enzyme or to a lysate containing the enzyme, during fermentation, the levels of mycotoxin, e.g., deoxynivalenol, in the resulting fermentation by-products, e.g., distiller's grain, are decreased relative to the levels of mycotoxin in by-products obtained from a feedstock processed in the absence of enzyme exposure, e.g. such as exposure to a yeast expressing a mycotoxin mitigating enzyme such as deoxynivalenol hydroxylase or exposure to a yeast lysate containing the mycotoxin mitigating enzyme.

In some embodiments, a method of mitigating mycotoxin contamination in a human food composition is provided. In some aspects, the method comprises processing a grain in the presence of a mycotoxin mitigating enzyme or a microorganism expressing an enzyme, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, and 2cys-peroxiredoxin. In some aspects, the enzyme can be a combination of enzymes, for example, an enzyme system that works in two or more steps to detoxify a mycotoxin. For example, the enzyme system can be DepA/DepB, where DepA converts DON to 3-keto-DON and DepB, an NADPH dependent dehydrogenase, catalyzes the reduction of 3-keto-DON to 3-epi-DON.

In some embodiments, a method of mitigating mycotoxin contamination in livestock feed is provided. In some aspects, the method comprises processing a feedstock in the presence of a mycotoxin mitigating enzyme or a microorganism expressing an enzyme, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, and 2cys-peroxiredoxin. In some aspects, the method comprises processing a feedstock in the presence of two or more mycotoxin mitigating enzymes, for example, DepA and DepB. In some aspects, the method comprises processing a feedstock in the presence of a microorganism expressing two or more enzymes, for example, DepA and DepB.

In some embodiments, a method of mitigating mycotoxin contamination in livestock feed is provided. In some aspects, the method comprises contacting a post-fermentation whole stillage, wet cake, thin stillage and/or concentrated thin stillage (e.g. syrup) stream with an enzyme to mitigate mycotoxin contamination, wherein the levels of mycotoxin in the livestock feed composition are decreased relative to the levels of mycotoxin in a livestock feed composition obtained from an untreated post-fermentation whole stillage, wet cake, thin stillage and/or concentrated thin stillage (e.g. syrup) stream.

In some embodiments, a method of mitigating mycotoxin contamination in livestock feed is provided. In some aspects, the method comprises contacting beer with an enzyme to mitigate mycotoxin contamination, wherein the levels of mycotoxin in the livestock feed composition are decreased relative to the levels of mycotoxin in a livestock feed composition obtained from untreated beer.

In some embodiments, a vector comprising the nucleic acid sequence encoding a mycotoxin mitigating enzyme is provided. For example, a vector comprising a nucleic acid sequence of SEQ ID NO: 1, or nucleic acid sequence having at least about 95%, or at least about 98%, or at least about 99% sequence identity to SEQ ID NO: 1, encodes deoxynivalenol hydroxylase. In some embodiments, the vector further comprises one or more nucleic acid sequences encoding a KdR gene or KdX gene. In some embodiments, the ddnA gene (SEQ ID NO: 1) is in one vector, the KdR gene is in another vector, and the KdX gene is in yet another vector. In some embodiments, all three genes are in one vector. In some embodiments, at least two of the ddnA gene, the KdR gene, and the KdX gene are in the same vector. In some embodiments, a vector comprises the nucleic acid sequences of one or both of DepA and DepB.

In some aspects, the vector is selected from the group consisting of pYEDP60 (*S. cerevisiae*) or pPINK (*P. pastoris*), though other commercially available vectors are known to those skilled in the art.

In some embodiments, a nucleic acid sequence of a mycotoxin mitigating enzyme is integrated into the genome of the microorganism, for example, via homologous recombination.

In some embodiments, a microorganism expressing one or more proteins encoded by the vector described herein is provided. In some aspects, the microorganism is selected from a yeast or a bacteria. In some aspects, the microorganism is engineered to express and/or excrete a mycotoxin mitigating enzyme. In some aspects, the microorganism is a genetically modified commodity yeast or a genetically modified consolidated bioprocessing yeast, wherein the yeast is genetically modified to express a mycotoxin mitigating enzyme. In some aspects, the microorganism is *S. cerevisiae*. In some aspects, the yeast is *Pichia pastoris*.

In some embodiments, use of a microorganism engineered to comprise the nucleic acid sequence encoding a mycotoxin mitigating enzyme is provided. In some aspects, the nucleic acid sequence is provided in a vector described herein. In some aspects, the nucleic acid sequence is integrated into the genome of the microorganism. In some aspects, the use comprises expressing a mycotoxin mitigating enzyme during fermentation, in beer, and/or in distiller's grain sourced from post-fermentation stillage, wherein fermentation feedstock is contaminated with mycotoxin. In some aspects, the mycotoxin mitigating enzyme is deoxynivalenol hydroxylase and the feedstock is contaminated with deoxynivalenol.

In some embodiments, a method for expressing a mycotoxin mitigating enzyme in a yeast host cell is provided. In some aspects, the method comprises: transforming the host cell with an integration vector comprising a nucleic acid having one or more expression cassettes comprising a nucleic acid encoding a mycotoxin mitigating enzyme, and a targeting nucleic acid that directs insertion of the integration vector into a particular location of the genome of the host cell by homologous recombination, wherein the transformed host cell produces the mycotoxin modulating enzyme.

BRIEF DESCRIPTION OF THE DRAWINGS

FIG. 1 depicts the surprising results achieved by purified enzyme addition as well as lysate addition to fermentation of a high DON corn, compared to a lack of change observed during fermentation in the absence of enzyme.

DESCRIPTION

Figure 2A:
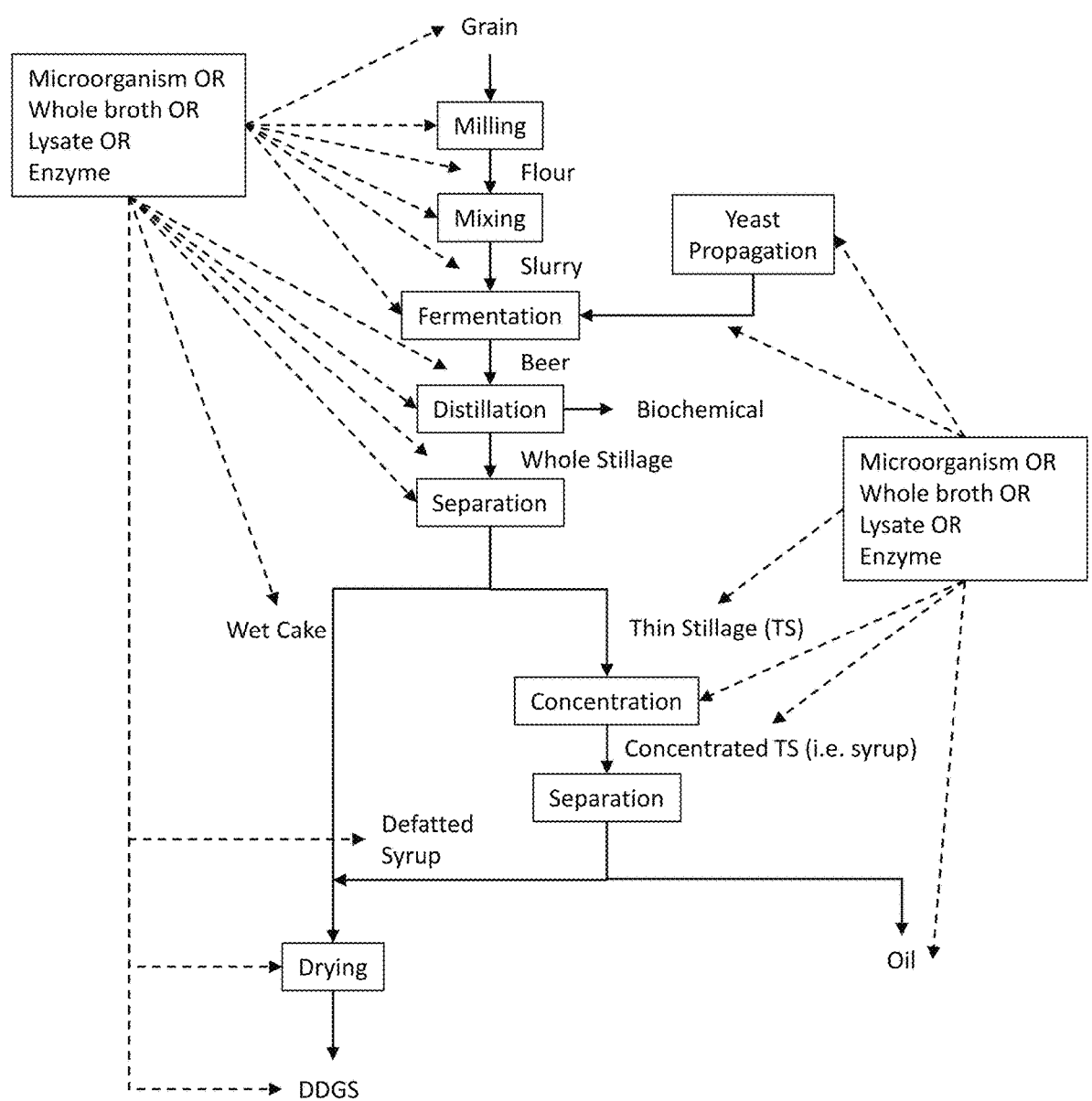
FIG. 2a is a schematic of an exemplary process showing examples of dry grind biorefinery process steps where the mycotoxin mitigating additions can be made.

As used in this specification and the appended claims, the singular forms "a", "an", and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All patents, applications and non-patent publications mentioned in this specification are incorporated herein by reference in their entireties.

Target chemicals are produced in biorefineries with biological catalysts, e.g. via fermentation. One example is corn to ethanol but fermentation of other feedstocks and the production of other products is also contemplated herein. In biorefineries, contaminants, e.g. mycotoxins, may be concentrated in the products of the biorefinery.

Mycotoxins are produced by fungi and are present in many agricultural crops but especially in grains including corn, barley, rye, triticale, and wheat. Contamination can occur in the field, after harvest and during storage, or even during processing into food and livestock feeds. Exemplary mycotoxins and the fungi that produce them are provided in Table 1.

TABLE 1

| Mycotoxin | Fungal Species |
| --- | --- |
| Deoxynivalenol, nivalenol, 3-ADON, 15-ADON | Fusarium graminearum, F. culmorum, F. crookwellense |
| Fumonisin $B_1$, $B_2$, $B_3$ | F. moniliform, F. verticilliodes, F. proliferatum |
| Zearalenone | F. graminearum, F. culmorum, F. equiseti |
| HT-2 toxin, T-2 toxin, Neosolaniol | F. equiseti, F. poae, F. sporotrichioides |
| Aflatoxins Bj, $B_2$; cyclopiazonic acid | Aspergillus flavus |
| Aflatoxins Bi, $B_2$, Gi, $G_2$ | A. parasiticus |
| Ochratoxin A; penicillic acid | A. ochraceus |
| Sterigmatocystin, cyclopiazonic acid | A. versicolor |
| Ochratoxin B, citrinin | Penicillium verrucosum |
| Rubratoxins | P. purpurogenum |
| Patulin, citrinin | P. expansum |
| Beauvericin | Beauveria bassiana |

Any mycotoxin of importance to human and animal food chains is contemplated as a target mycotoxin, including the mycotoxins included in Table 1. A "mycotoxin mitigating enzyme" or "mycotoxin modulating enzyme" includes any enzyme capable of detoxifying mycotoxins present in grains. It has been determined herein that mycotoxin mitigating enzymes can be expressed by microorganisms and that grains and/or intermediate grain processing streams can be exposed to such microorganisms and/or expressed enzymes during the processing of the grains into food or feed products, for example, before, during, or after such nonlimiting examples as storage, steeping, milling, mixing, cooking, liquifying, saccharifying, fermenting, distilling, pumping, separating, concentrating, evaporating, filtering, drying, refining, degerminating, and/or other processes used to process grain into food or feed products. Feedstocks, intermediate streams, and/or products may also be exposed to such microorganisms and/or expressed enzymes. Non-limiting examples include whole grain, cracked grain, steeped grain, steep water, steep liquor, flour, slurry, beer, whole stillage, wet cake, thin stillage, concentrated thin stillage (e.g. syrup), defatted concentrated thin stillage (e.g. syrup), germ, oil, fiber, protein, starch, biochemicals, syrups, and dried distillers grains. Such exposure can be e.g. to the organism, a broth containing the organism, a lysate formed by lysing the organism, a concentrate of the organism or lysate, and/or to the isolated and/or concentrated enzyme. Depending on the heat tolerance of the organism or enzyme some streams may be less suitable for exposure.

Mycotoxin contamination of food and feed products can lead to adverse results. For example, in livestock feed, the presence of mycotoxins may cause animal feed refusal resulting in lack of weight gain. In processing grains into feed and food products, mycotoxins can become concentrated. For example, fermentation, solid liquid separation, evaporation, and drying processes in a biorefinery can result in concentration of mycotoxins in co-product streams like distillers grains, such as malt distillers grains, brewers grains, condensed distillers solubles, dried distillers solubles, distillers wet grains, distillers wet grains with solubles, gluten meal (e.g. protein), and gluten feed and the like used for animal feed. Similarly, in processing grains into human food products, such as corn into corn starch or corn syrup, mycotoxins may become concentrated and a threat to human health.

Deoxynivalenol (DON) is produced by several fungi in the Fusarium genus including F. graminearum and F. culmorum. Nivalenol (NIV), 3-ADON, 15-ADON, and T-2 toxin are also produced by the Fusarium fungi. The chemical structure of DON is shown below:

The three free hydroxy groups on the molecule are associated with its toxicity. In humans, DON elicits strong emetic effects after consumption, as the toxin reduces brain levels of serotonin and interacts with dopaminergic receptors in the brain. DON can be present in grains including oats, barley, wheat, corn, buckwheat, sorghum, rice, and popcorn, as well as flour, bread, breakfast cereals, noodles, infant foods, pancake mixes, noodles, beer, and malt.

Deoxynivalenol hydroxylase is an exemplary mycotoxin mitigating enzyme (encoded by DdnA, SEQ ID NO: 1). The enzyme modifies the C-16 carbon in DON, catalyzing the monooxygenation of the allylic methyl group of DON. This enzyme can also interact with NIV and 3-ADON, modifying the mycotoxins to a more tolerable, less toxic form. Methods of using this enzyme in decontaminating grains used for human or animal consumption are provided herein. Other mycotoxin mitigating enzymes include, but are not limited to, aflatoxin oxidase, 3-O acetyltransferase, peroxidase, F420H2-dependent reductases, Ery4, UDP-glycosyltransferase, laccase, manganese peroxidase, and lactono hydrolase, xylanase, DepA/DepB, and 2cys-peroxiredoxin. Microorganisms are engineered to express these enzymes are useful in the methods disclosed herein.

Aflatoxins are toxins produced by the mold *Aspergillus flavus* that can grow on food ingredients such as corn, peanuts, and other grains. At high levels, aflatoxins can cause illness (aflatoxicosis), liver damage, and death. The enzyme aflatoxin oxidase is useful in mitigating aflatoxin contamination of grains and food products produced using the contaminated grains.

Zearalenone is a potent estrogenic metabolite produced by some *Fusarium* and *Gibberella* species. The mycotoxin is heat-stable and is a contaminant of cereal crops such as maize, barley, oats, wheat, rice, and sorghum. Zearalenone concentrations are low in grain contaminated in the field, but levels increase under storage conditions with moisture greater than 30%-40%. Zearalenone is problematic for the swine industry, and particularly affects male and female reproduction. The enzymes lactonohydrolase or Zearalenone hydrolase detoxify zearalenone.

Compositions

Provided are compositions produced according to the methods disclosed herein, both for human consumption and animal consumption, which have decreased levels of mycotoxin contamination. The composition can be a human food product, e.g. any food containing grain products sourced from mycotoxin contaminated grains. Exemplary food products include most processed foods containing grains, including flour, bread, cereals, noodles, infant foods, pancake mixes, beer, and malt. The composition can be an animal feed, for example, a feed for livestock such as beef cattle, dairy cattle, swine, sheep, goats, poultry, etc., a feed for horses, donkeys, ponies, mules, etc., a feed for ruminating zoo animals, or can be a feed for companion animals such as dogs, cats, birds, etc. Acceptable levels of mycotoxins depend on the animal species and the mycotoxin. For example, maximum levels of DON are typically less than 20 ppm, for example, less than about 15 ppm, or less than 12 ppm, or less than 10 ppm, or less than 9 ppm, or less than 8 ppm, or less than 7 ppm, or less than 6 ppm, or less than 5 ppm, or less than 4 ppm, or less than 3 ppm, or less than 2 ppm, or less than 1 ppm. For example, in a feed composition for beef cattle, many sources recommend the levels of DON be 10 ppm or less; in a feed composition for dairy cattle, the levels of DON are recommended to be 2 ppm or less; in a feed composition for poultry, the levels of DON are recommended to be 2 ppm or less.

A livestock feed composition can comprise distiller's grain sourced from feedstock exposed to an enzyme to mitigate mycotoxin contamination or a microorganism expressing an enzyme to mitigate mycotoxin contamination during processing of the feedstock, e.g. during fermentation. A livestock feed composition can comprise distillers' grain sourced from stillage, wet cake, and/or a syrup stream treated with an enzyme to mitigate mycotoxin contamination or a microorganism expressing an enzyme to mitigate mycotoxin contamination. In some aspects, the levels of mycotoxin in the livestock feed composition are decreased relative to the levels of mycotoxin in a livestock feed composition obtained from untreated stillage, wet cake, and/or syrup stream. A livestock feed composition can comprise distiller's grains, such as malt distiller's grains, brewers grains, condensed distiller's solubles, dried distillers solubles, distiller's wet grains, distiller's wet grains with solubles, gluten meal, and gluten feed treated with an enzyme to mitigate mycotoxin contamination or a microorganism expressing an enzyme to mitigate mycotoxin contamination.

A typical feedstock can include any grain or cereal crop, for example, wheat, corn, sorghum, hops, oats, barley, rye, buckwheat, etc.

Systems and Methods

The microorganism expressing the mycotoxin mitigating enzyme can be inoculated into any suitable process streams and grown in situ. In an illustrative example, the microorganism can be inoculated into a mixing, steeping, propagation, saccharification, fermentation, stillage, syrup or other stream.

The microorganism expressing the mycotoxin mitigating enzyme can be grown separately and used as a whole broth to treat one or more or feed stock, process stream, or products. The culture may be concentrated prior to use, e.g., by filtering, evaporating, membrane separation, settling, centrifugation or other concentration method. The microorganism may be lysed to enhance enzyme exposure. Lysis can be accomplished by any suitable methodology known in the art. In an illustrative example, lysis is accomplished by homogenization. In an illustrative example, after growth and throughout further processing, the temperature is maintained below 150° F., even below 130° F. In an illustrative example, lysate is used or stored at or below 40° F.

Microorganisms can be grown in fed-batch or continuous fermentation methods depending on the organism used and the requirements for growth and robust enzyme expression (e.g. 1-10000 mg/L). In most cases, these organisms will be grown to late stationary phase, under conditions to promote expression of the enzymatic system. This is dependent upon the explicit system for expression, i.e. constitutive vs induced expression.

Figure 2B:
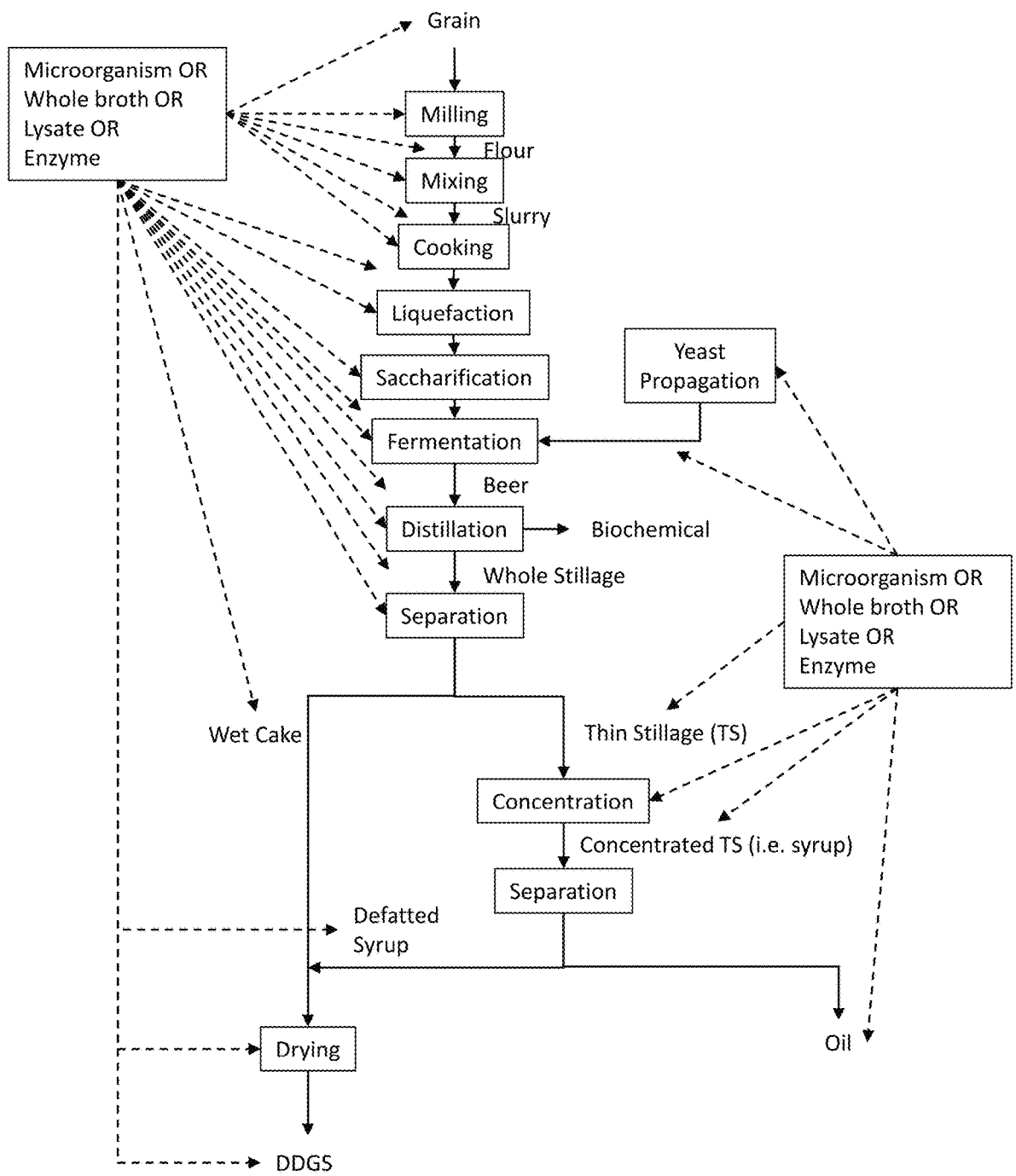
FIG. 2b is a schematic of an exemplary process showing examples of dry grind biorefinery process steps, including optional separate cooking, liquefaction, and saccharification steps, where the mycotoxin mitigating additions can be made.

In an illustrative example, exposure of one or more of feedstock, process streams and/or products in a dry mill plant, e.g. as shown in FIGS. 2a and 2b, to one or more mycotoxin mitigating enzymes can result in reduced levels of contamination of plant products. Such exposure can be to a microorganism expressing the enzyme, a broth containing the organism, a lysate formed by lysing the organism, a concentrate of the organism, broth, or lysate, and/or to the isolated and/or concentrated enzyme. For example, in a dry grind ethanol plant, grain such as corn is used as a feedstock and ethanol is produced by fermentation of the starch contained within the grain. The fermentation product includes ethanol, water, and soluble components as well as residual unfermented particulate matter (among other things). The fermentation product is distilled and dehydrated to recover ethanol. The residual matter (e.g., whole stillage) comprising water, soluble components, oil, and unfermented solids can be further processed to separate out desirable fermentation by-products, for example, dried distillers' grains with solubles (DDGS), mash, beer, whole stillage, thin stillage, wet cake, syrup, etc., used for animal feed.

Figure 2C:
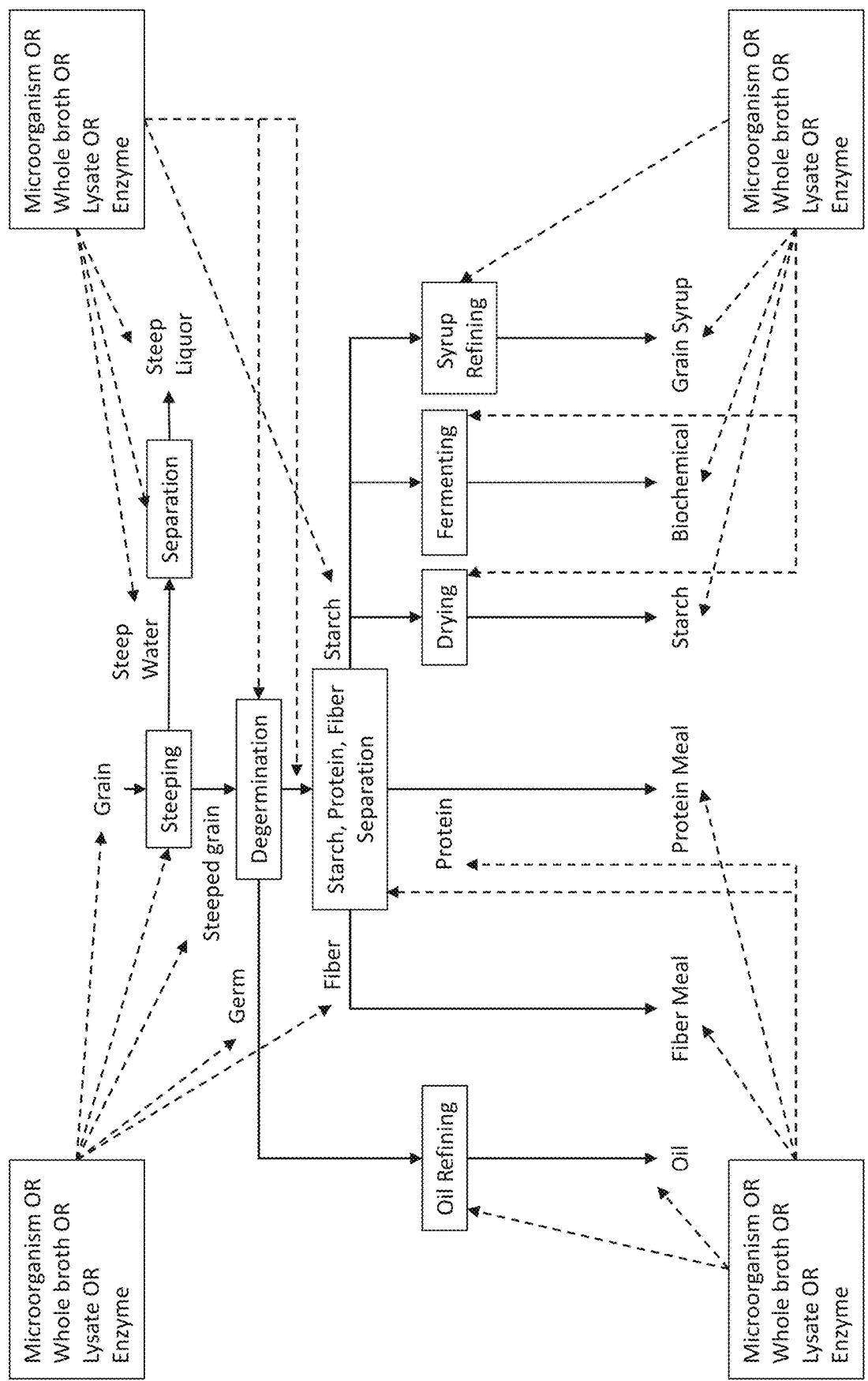
FIG. 2c is a schematic of an exemplary process showing examples of wet grind biorefinery process steps where the mycotoxin mitigating additions can be made. The fermenting step could be accompanied by one or more additional steps as shown in FIGS. 2a and 2b, e.g., cooking liquefaction, saccharification, and yeast propagation.

In an illustrative example, exposure of one or more of feedstock, process streams and/or products in a wet mill plant, e.g. as shown in FIG. 2c, to one or more mycotoxin mitigating enzymes can result in reduced levels of contamination of plant products. Such exposure can be to a microorganism expressing the enzyme, a broth containing the organism, a lysate formed by lysing the organism, a concentrate of the organism, broth, or lysate, and/or to the isolated and/or concentrated enzyme. For example, in a corn wet mill, steeping, actually a controlled fermentation, is essential for high yields and high starch quality. Cleaned corn is placed into large steeping tanks (steeps), where the corn is soaked in hot water to begin breaking the starch and protein bonds. The gluten bonds within the corn begin to loosen and release the starch. Addition of sulphur dioxide can improve the fermentation by enhancing growth of favorable microorganisms, such as *lactobacillus,* while suppressing detrimental bacteria, molds, fungi, and yeast. Solubles are extracted and the kernel softens. Exemplary products in addition to a biochemical such as ethanol, include corn fiber, corn and yeast protein, corn starch, corn syrup, and corn oil.

Systems for expressing enzymes useful in mitigating mycotoxin contamination of human and animal feed compositions, for example, by exposing feedstock and processing streams, include vectors containing a gene encoding a mycotoxin mitigating enzyme, and microorganisms expressing the gene. Microorganisms expressing these enzymes can be added to steep tanks, propagation and/or fermentation tanks, can be added to beer, and/or can be added to the post-fermentation stillage, wet cake, and/or syrup stream. Microorganisms expressing these enzymes can be added to mash used to prepare pellets, dog food, and cat food, for example. As an added benefit, the microorganism may add to the amino acid profile of the protein in the animal feed, e.g. the DDGS or high protein product.

In some aspects, microorganisms expressing the enzymes can be lysed and the enzyme added to steep tanks, propagation and/or fermentation tanks, can be added to beer, and/or can be added to the post-fermentation stillage, wet cake, and/or syrup stream. Lysate containing these enzymes can be added to mash used to prepare pellets, dog food, and cat food, for example. The lysed slurry can be added directly, or can be further purified to concentrate the mycotoxin mitigating enzymes before adding. In some aspects, the enzymes are purified and added to the process in a concentrated amount, for example, in the mash, beer, whole stillage, thin stillage, wet cake, syrup, DDGS, etc. Purified enzymes can be dosed, permitting controlled activity as desired at different parts of the fermentation process.

Relative to other approaches in mitigating mycotoxin contamination, the process disclosed herein is beneficial in that processing equipment is not exposed to corrosive agents typically used to reduce mycotoxin levels. Furthermore, this approach provides for a more nutritional product, with higher consistency in nutritional value, texture, taste, and appearance, as other systems used to mitigate mycotoxins can alter feed color, non-protein nitrogen, alter fat profiles, or in other ways result in a detriment to the final feed nutritional value.

Genes encoding the mycotoxin mitigating enzyme can be engineered into an ethanol production yeast so that it expresses the enzyme during propagation and/or fermentation to mitigate mycotoxin contamination present in the feedstock.

Genes encoding the mycotoxin mitigating enzyme can be engineered into a separate microorganism, e.g. yeast or bacteria, that is co-fermented with the production yeast.

Genes encoding the mycotoxin mitigating enzyme can be engineered into a separate microorganism that is independently propagated and then combined with a contaminated broth prior to distillation or combined with a post fermentation stillage, wet cake, and/or syrup stream.

Under any of the growth conditions useful in allowing the microorganism to express the mycotoxin mitigating enzyme, it can be helpful to add an iron source for improved function of the enzyme. Exemplary iron sources include $FeCl_3$. 5-aminolevulinic acid is a heme precursor and can be used as a cofactor to assist in bacterial expression and activity of the Ddna enzyme.

Methods of fermentation can comprise the steps of any typical fermentation, whether in production of biofuels or foods and drinks for human and animal consumption. However, it is shown herein that an added step of adding a microorganism expressing a mycotoxin mitigating enzyme to the fermentation process decreases the levels of mycotoxins in the food and drink products and livestock feeds.

Methods of mitigating mycotoxin contamination in livestock feed composition and/or human foods can entail fermenting a feedstock in the presence of a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, DepA/DepB, and 2cys-peroxiredoxin.

Methods of mitigating mycotoxin contamination in livestock feed composition and/or human foods can comprise contacting post-fermentation products including post-fermentation beer, stillage, wet cake, and/or syrup stream with an enzyme to mitigate mycotoxin contamination. The levels of mycotoxin in the livestock feed composition and/or human foods are decreased relative to the levels of mycotoxin in a livestock feed composition obtained from untreated post-fermentation products.

Methods of mitigating mycotoxin contamination in livestock feed can comprise contacting beer with an enzyme to mitigate mycotoxin contamination. The levels of mycotoxin in the livestock feed composition are decreased relative to the levels of mycotoxin in a livestock feed composition obtained from untreated beer.

Lysate containing the mycotoxin mitigating enzyme can be used in excess as needed to decontaminate the particular mycotoxin. In some aspects, the mycotoxin contaminated composition can be treated with about 50 mg lysate to about 150 mg lysate per gram solids in the treated material. In some aspects, the composition can be treated with about 80 to about 120 mg lysate per gram solids. In some aspects, the composition can be treated with about 100 mg lysate per gram solids. In purified versions, the mycotoxin mitigating enzyme would be dosed at about 5 mg enzyme to about 15 mg enzyme per gram solids, even about 8 mg enzyme to about 12 mg enzyme per g solids, even about 10 mg enzyme per gram solids. The enzyme dose can also depend on yeast expression and activity of the particular enzyme. In some aspects, the dosage is from about 0 to 100 fold excess beyond the concentration of the contaminating mycotoxin.

In some aspects, the mycotoxin contaminated composition is treated with a high dose of mycotoxin mitigating enzyme, for example, about 100 to about 1000 mg lysate containing enzyme per gram solids of the contaminated composition. In some aspects, the mycotoxin contaminated composition is treated with a low dose of mycotoxin mitigating enzyme, for example, about 5 to about 50 mg enzyme per gram solids.

The dose can vary from the above parameters depending on the original concentration of mycotoxin in the contaminated composition. For example, highly contaminated material may require a correspondingly higher dose than less contaminated material. The level of contamination may be determined by measuring the contamination in the feedstock on a parts per million basis and a dose may be determined based on that level of contamination. For example, in treating a composition derived from a contaminated feedstock with a cell lysate, the dose may be stated as the number of milligrams of lysate per gram of solids in the treated composition per parts per million contaminant level of the feedstock. The dose may be 1-1000 mg of lysate, even 10-500 mg of lysate, even 50-500 mg lysate, even 10-50 mg of lysate per gram of solids in the treated composition per parts per million contamination in the feedstock. For example, a fermentation composition in a corn fermentation facility may be treated with a dose of 10 mg of lysate as follows. The contamination level, e.g, of DON in the corn feedstock may be measured as, e.g., 5 ppm. The dose would then be calculated as 10 mg/g solids/ppm contamination x #grams of solids x 5ppm contamination to yield a dose of 50 mg/g of solids in the fermenter.

Vectors and Host Cells

Methods for expressing a mycotoxin modulating enzyme in a yeast host cell can comprise transforming a host cell with an integration vector comprising a nucleic acid having one or more expression cassettes comprising a nucleic acid encoding a mycotoxin modulating enzyme, and a targeting nucleic acid that directs insertion of the integration vector into a particular location of the genome of the host cell by homologous recombination. The transformed host cell produces the mycotoxin modulating enzyme.

Vectors are provided for transforming a microorganism into an engineered microorganism for producing a mycotoxin mitigating enzyme. The vectors can comprise a nucleic acid sequence encoding one or more mycotoxin mitigating enzymes selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, xylanase, DepA/DepB, and 2cys-peroxiredoxin. For example, the vector can include the nucleic acid sequence of SEQ ID NO: 1 which encodes deoxynivalenol hydroxylase. In some embodiments, the vector further comprises one or more nucleic acid sequences encoding a KdX gene (SEQ ID NO: 2) or KdR gene (SEQ ID NO: 3). Alternatively, the vector can include a nucleic acid sequence which comprises the promoter, terminator, tag, and gene encoding the mycotoxin mitigating enzyme (SEQ ID NO: 10). In some aspects, the vector is selected from the group consisting of pYEDP60 (*S. cerevisiae*), pPINK (*P. pastoris*), or pCWori (bacterial).

Microorganisms useful herein are transformed with a vector comprising the nucleic acid sequence encoding a mycotoxin mitigating enzyme. The microorganism can be a yeast or a bacteria. The microorganism can be engineered to express and/or excrete a mycotoxin mitigating enzyme. The microorganism may be used solely to decontaminate a feedstock, process stream, or product. The microorganism may be an organism that is also used to carry out a primary conversion of a feedstock to a desired product. The microorganism may be an accessory microorganism that is cocultured with another microorganism so that it provides the decontaminating enzyme while the other organism produces a desired product. The microorganism can be separately cultured and added as a whole microorganism, whole broth, as a lysate, or isolated enzyme. Illustratively, the microorganism can be a yeast used in fermenting a feedstock in a bioethanol production facility or can be a yeast used in steeping corn for production of corn starch. The yeast can be, for example, a genetically modified commodity yeast or a genetically modified consolidated bioprocessing yeast. The yeast can be, for example, *S. cerevisiae* or *P. pastoris*.

The microorganisms comprising such vectors are useful in expressing deoxynivalenol hydroxylase or another mycotoxin mitigating enzyme during fermentation, for example, in beer, and/or in distiller's grain sourced from post-fermentation stillage, wherein fermentation feedstock is contaminated with a mycotoxin such as deoxynivalenol.

EXAMPLES

The following examples are provided for illustrative purposes only and are not intended to limit the scope of the invention.

Example 1: Deoxynivalenol Hydroxylase Expression in *P. Pastoris* and *S. Cerevisiae* Yeast DNA Resuspension:

DdnA DNA, KdX DNA, and KdR DNA, obtained from GenScript, is centrifuged at 6,000×g for 1 min at 4° C. 20 μL sterilized deionized water is added to dissolve DNA. The vial is vortexed for 1 min. The solution is then heated at 50° C. for 15 min to ensure DNA is dissolved in liquid, then stored at −20° C. until use.

Plasmid *E. coli* Transformation:

Chemically competent DH5a cells are thawed on ice for 20-30 min. DdnA DNA (1-2 μL) is added to chemically competent cells and gently mixed by flicking the bottom of the tube. The mixture is incubated on ice for 20-30 minutes, then heat shocked for 30-60 seconds at 42° C. The mixture is placed back on ice for 2 min and the cells are allowed to recover. 250-1000 μL of LB or SOC media without antibiotic is added to the mixture and incubated for 45-60 min at 37° C. Following incubation, the sample is gently centrifuged at 4,000×g for 1 min at 4° C. Three quarters of the remaining liquid is removed and the cell pellet is resuspended with the remainder liquid. The liquid is plated on room temperature LB agar plates with selective antibiotic and placed in a 37° C. incubator overnight (plates are pulled within 12-18 hours). Colonies are selected and grown in liquid culture. Freezer stock is made and DNA sequence is checked.

Transferring Gene from *E. Coli* Plasmid to Yeast Plasmid:

DdnA, KdX, and KdR sequences were codon biased for expression in a yeast host, and had a histidine or FLAG tag to the C-terminal side. A secretion signal can also be added to the 5' side of the DNA to signal secretion in the yeast.

Restriction Enzyme Digestion: 5' End (Start of Gene) Cut with EcoRI and 3' End (End of Gene) Cut with RsrII, SphI, StuI, KpnI, NaeI, FseI, or SwaI. Enzyme and DNA are mixed (Both Yeast Plasmid and *E. coli* Plasmid [Individually]) at 37° C. for 2-24 hr.

2 μL DNA
1 μL 10× Restriction Enzyme Buffer
5 μL Sterile Water
1 μL EcoRI
1 μL RE2* (*or any appropriate $2^{nd}$ restriction enzyme)

A 1.5% agarose gel is run to separate cleaved gene from plasmid and to clean up plasmid to keep it from ligating back to itself.

The purified cut pieces are then ligated:

2 μL 5× Ligation buffer
0.5 μL T4 DNA Ligase
1 μL Yeast Plasmid

1 μL Insert Gene
5.5 μL Sterile Water

Ingredients are mixed gently, then centrifuged to get all liquid to bottom of tube, and incubated at 25° C. for 1-2 hours or 16 C overnight. The yeast plasmid is transformed into *E. coli*, grown, sequenced, and purified for transformation of the plasmid DNA into Yeast.

Additional Methods for Construction of the Final Yeast Vector:

Gateway cloning protocol is used to combine all three genes into a single construct for placement in to a yeast vector to be integrated in to the yeast genome. Generally the protocol is as follows:

Following solutions are mixed:
1 uL destination vector
75 ng of each gene or insert in a 2:1 ratio dependent upon origination of insert solution
2 uL T4 DNA Ligase Buffer
1-2 uL Golden Gate Assembly Mix
Nuclease Free Water to 20 uL Once mixed well, the reaction undergoes the following protocol in a thermocycler: either: 37C for 1 hr, followed by 60° C. for 5 min or (37° C. for 1 min, 16° C. for 1 min) for 30-35 cycles followed by a 60° C. incubation for 5 min. These constructs are then transformed into *E. coli* for primary screening prior to transformation into yeast.

Plasmid Yeast Transformation:

Yeast from YPD plate are inoculated into 20 mL of YPD medium in 100 mL sterile flask and grown overnight with shaking (200-250 rpm) at 30° C. to reach stationary phase. The culture is diluted into 100 mL of YPD medium in 500 mL flask to OD600 of ~0.3, and grown with shaking at 30° C. for 3-6 hr, OD600. The culture should double and not surpass 1.5 ($OD_{600}$). Cells are harvested by centrifugation at room temperature for 5 min at 5,000 rpm. Supernatant is discarded and cells resuspended in 50 mL of sterile water. Centrifugation is repeated.

Supernatant is discarded and the cell pellet resuspended in 1 mL of transformation buffer (cells are now ready for transformation). Salmon testes DNA is aliquoted at 10 μL of 10 mg/mL into each transformation tube, along with 0.1 μg of yeast plasmid DNA. 100 μL of competent cells are added and the mixture is vortexed. 600 μL of PLATE Buffer is added and the mixture is vortexed again. The mixtures are incubated for 30 min at 30° C. with shaking. 10% DMSO is added, and the mixture is heat shocked for 15 min at 42° C. The mixture is spun to pellet the cells, and the supernatant is removed. The cells are resuspended in 500 μL of sterile water and plated at 100 μL on appropriate SC selective plates without required supplement. Plates are then incubated at 30° C. for 2-3 days until colonies appear.

Western Blotting for Protein Expression Testing:

The deoxynivalenol hydroxylase enzyme is tagged with a C-terminal histidine or FLAG tag which is probed for in a Western blot. Western blot analysis is used for monitoring protein (enzyme) expression during bacterial or yeast growth.

Cellular growth is centrifuged and the cell pellet (solids) and the supernatant (aqueous) are separated and saved separately. Cell pellets are resuspended in a general low molar TRIS buffer and treated to break open cells (for example, by bead beating, sonicating, homogenizing, chemical treatments). The solution is centrifuged following cell rupture in an ultra-centrifuge to separate the cell debris and the soluble protein, and both fractions are kept.

The soluble aqueous phase can be run as is, or enriched further by running the soluble protein over an affinity column for a His-Tag or FLAG-Tag (Nickel or FLAG column). The protein is eluted off the column using increasing salt concentrations resulting in an enriched fraction. This fraction, or any of the previous fractions are then run on an SDS-PAGE protein gel-12% -18% acrylamide gels, for example. Once the gel has run under standard conditions, the proteins are transferred to a membrane (PVDF) and blocked with rehydrated milk powder. After blocking, a primary antibody to the His- or FLAG-Tag is added and allowed to incubate overnight at 16° C.

Following primary incubation, the membrane is washed several times before adding secondary antibodies which have a horseradish peroxidase attached. Secondary incubation is between 1 and 3 hours at room temperature.

The membrane is again washed, then signal compound is added to produce light at any band that the antibodies attached to. Tagged proteins are visualized on a gel box.

Example 2: Addition of Deoxynivalenol Hydroxylase Expressing *P. Pastoris* or *S. Cerevisiae* to Corn Steep Whole corn contaminated with DON is filled into three large steeping tanks (steeps) and soaked in hot water 30 to 48 hours to begin breaking the starch and protein bonds. *P. pastoris* expressing deoxynivalenol hydroxylase and *S. cerevisiae* expressing deoxynivalenol hydroxylase are added, one to each of the steep tanks, and enzyme levels are monitored in each of the two steep tanks to ensure proper expression. The third steep tank is held under identical conditions but lacks addition of either microorganism. At 6 hour increments over the duration of the steep, water samples are obtained and DON levels are assessed in each sample. Over time, DON levels decrease in the steep water from treated tanks.

Example 3: Addition of Deoxynivalenol Hydroxylase Expressing *S. Cerevisiae* to Fermentation Tank Ground corn or other feedstock is combined with water to form a slurry, and the pH of the slurry mixture is adjusted as needed. *S. cerevisiae* engineered to express deoxynivalenol hydroxylase is added to the fermenter along with an amount of yeast starter effective to produce a commercially significant quantity of ethanol. The fermentation is carried out for about 88 hours. Enzyme levels are monitored to ensure expression and proper levels to mitigate DON contamination. Samples of the solids are obtained at regular intervals to assess DON levels. Resulting post-fermentation products show commercially acceptable levels of DON (ppm).

Example 4: Addition of Deoxynivalenol Hydroxylase Via Lysate in Fermentation A 72 hour fermentation was performed on DON contaminated corn in the presence or absence of a cell lysate of yeast genetically modified to produce deoxynivalenol hydroxylase (Ddna—the main catalytic enzyme), Kdr, or Kdx, the latter two of which are accessory recycling enzymes. The yeast cultures were grown to a late logarithmic growth phase or early stationary growth phase while producing mycotoxin mitigating enzymes, and then lysed. The yeast lysates were mixed to a 1:1:1 ratio, such that the final dosing was equal for each enzyme at 5-10 mg protein (which contained the enzyme) per gram solids, and added to the fermentation.

Results were analyzed for mycotoxin concentration and ethanol titer. DON in ppm was measured by LC/MS on all fermentation solids after 88h of fermentation and dry down. Comparative measurements were made based on untreated control fermentations done at the same time as the treated fermentations. The data in FIG. 1 shows that the enzymes are active in the yeast lysate and available to the corn, thus reducing DON contamination, and pose no harm to the final ethanol titer. Compared to the untreated control, DON levels in the treated samples were reduced by 94%. The % mitigated is relative to the untreated control fermentation, and not based on the starting to ending fermentation DON concentrations (ppm).

Figure 3:
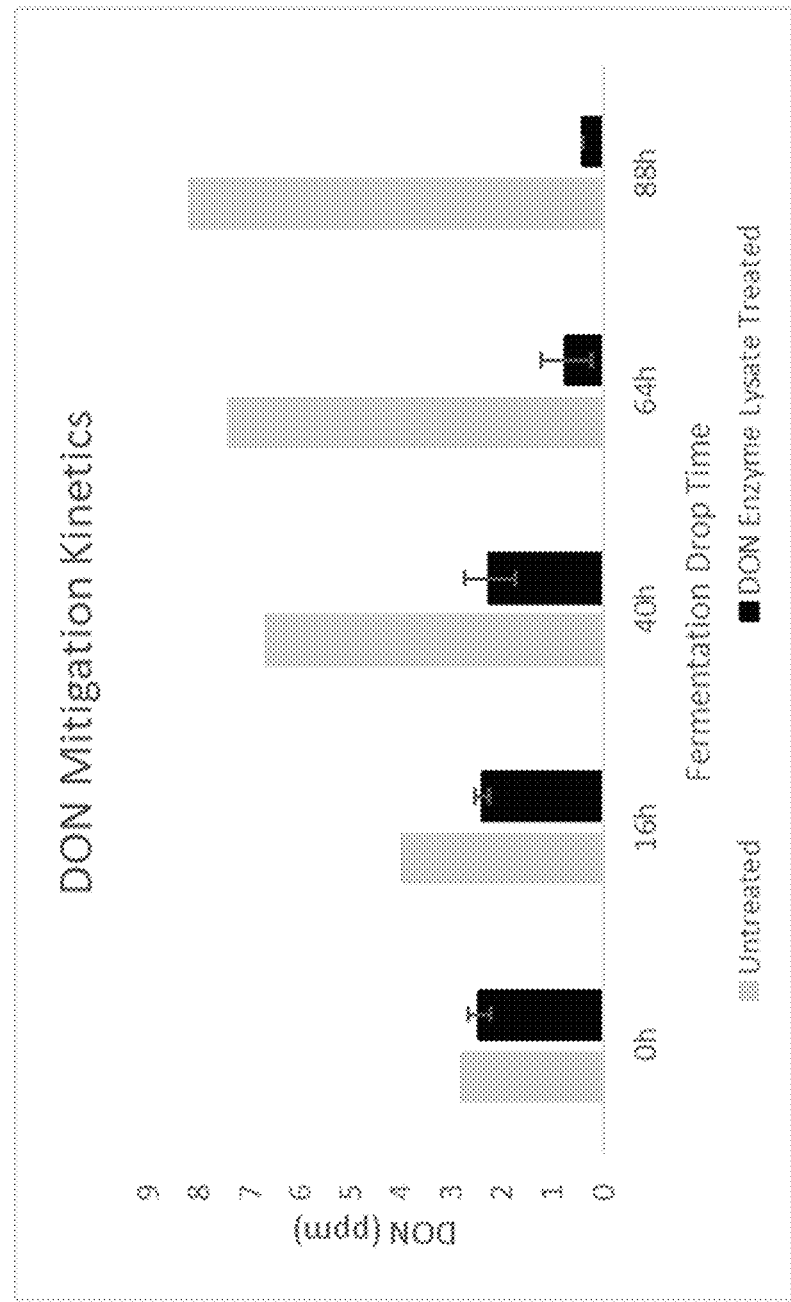
FIG. 3 shows DON levels (ppm) over time (0 to 88 hours fermentation) with yeast lysate containing deoxynivalenol hydroxylase compared to a control fermentation in the absence of enzyme.

In a similar experiment, 88 hour fermentations were performed on DON contaminated corn in the presence or absence of a cell lysate obtained from a yeast genetically modified to produce deoxynivalenol hydroxylase. At various timepoints during the fermentation, DON levels were assessed in the untreated control and treated fermenters using LC/MS. FIG. 3 shows DON mitigation kinetics over the 88 hour fermentations. Over time, the levels of DON in the enzyme treated fermentations decrease to less than 2 ppm.

Example 5: Whole Stillage Treatment

Following distillation and removal of the ethanol fraction, mycotoxin-contaminated whole stillage is treated over a relatively shorter time with a high dose, e.g. 100-1000 mg whole cell lysate obtained from *S. cerevisiae* genetically modified to produce a mycotoxin mitigating enzyme containing enzyme per gram solids, or a relatively longer time at a lower dose, e.g. 5-50 mg whole cell lysate enzyme per gram solids. Samples are tested every 2-4 hours to determine mycotoxin concentration. Whole stillage after treatment exhibits commercially acceptable levels of DON (ppm).

Example 6: Secondary Whole Stillage Fermentation

Whole stillage obtained after ethanol distillation is subjected to a secondary fermentation with an ethanologen expressing one or more mycotoxin mitigating enzymes. Samples are obtained every 4-6 hours during the fermentation and assessed for mycotoxin levels. During the second fermentation, the mycotoxin is reduced. Resulting feed products show commercially acceptable levels of mycotoxin presence.

Example 7: Treatment of the Solubles and Syrup

In a first vat, lysate of microorganisms producing mycotoxin mitigating enzymes is dosed into the syrup tank and allowed to mitigate mycotoxin over the holding time and prior to dosing the feed in the drying process.

In a second vat, a live microorganism expressing mycotoxin mitigation enzymes is grown in the syrup or solubles. Both experiments demonstrate effectiveness of treatment of the partial stream containing mycotoxin which remains in the wet-cake or feed solids after separation of the two streams.

In further experiments, two vats containing mycotoxin contaminated thin stillage streams are treated with whole cell lysate from a mycotoxin mitigating enzyme producing microorganism or live microorganism expressing mycotoxin mitigation enzymes, respectively. A third vat is subjected to identical conditions but is not treated with enzyme. The three vats are incubated for 48-60 hours and samples are obtained from each vat every 4-8 hours to track mycotoxin levels. Over time, mycotoxin levels decrease to acceptable levels.

Example 8: Addition of Aflatoxin Oxidase Expressing *S. Cerevisiae* and *P. Pastoris* to Wheat Steep Wheat contaminated with aflatoxin is filled into three large steeping tanks (steeps) and soaked in hot water 30 to 48 hours to begin breaking the starch and protein bonds. *P. pastoris* expressing aflatoxin oxidase and *S. cerevisiae* expressing aflatoxin oxidase are added, one to each of the steep tanks, and enzyme levels are monitored in each of the two steep tanks to ensure proper expression. The third steep tank is held under identical conditions but lacks addition of either microorganism. At 6 hour increments over the duration of the steep, water samples are obtained and aflatoxin levels are assessed in each sample. Over time, aflatoxin levels decrease in the steep water from treated tanks.

Example 9: Secondary Whole Stillage Fermentation

Whole stillage obtained after ethanol distillation is subjected to a secondary fermentation with an ethanologen expressing 3-O acetyltransferase. Samples are obtained every 4-6 hours during the fermentation and assessed for DON levels. During the second fermentation, the levels of DON are reduced. Resulting feed products show commercially acceptable levels of mycotoxin presence.

Example 10: Addition of DepA and DepB Expressing *S. Cerevisiae* to Fermentation Tank Ground corn or other feedstock is combined with water to form a slurry, and the pH of the slurry mixture is adjusted as needed. *S. cerevisiae* engineered to express DepA and DepB is added to the fermenter along with an amount of yeast starter, i.e. ethanologen, effective to produce a commercially significant quantity of ethanol. Cofactors are added at the start of fermentation, including pyrroloquinoline quinone (PQQ) or methoxatin as purified powder or fruit extract. The fermentation is carried out for about 88 hours. Enzyme levels are monitored to ensure expression and proper levels to mitigate DON contamination. Samples of the solids are obtained at regular intervals to assess DON levels. Resulting post-fermentation products show commercially acceptable levels of DON (ppm).

Example 11: Addition of Yeast Lysate Containing DepA and DepB to Fermentation Tank Ground corn or other feedstock is combined with water to form a slurry, and the pH of the slurry mixture is adjusted as needed. *S. cerevisiae* engineered to express DepA and DepB is lysed and the lysate is added to the fermenter along with an amount of a yeast starter effective to produce a commercially significant quantity of ethanol. Cofactors are added at the start of fermentation, including pyrroloquinoline quinone (PQQ) or methoxatin as purified powder or fruit extract. The fermentation is carried out for about 88 hours. Enzyme levels are monitored and additional lysate added as needed to decreased DON contamination. Samples of the solids are obtained at regular intervals to assess DON levels. Resulting post-fermentation products show commercially acceptable levels of DON (ppm).

ADDITIONAL EXAMPLES

1. A livestock feed composition comprising distiller's grain sourced from feedstock fermented in the presence of a microorganism expressing an enzyme to mitigate mycotoxin contamination, or a cell lysate comprising a microorganism expressing an enzyme to mitigate mycotoxin contamination, wherein the levels of mycotoxin in the livestock feed composition are decreased relative to the levels of mycotoxin in a livestock feed composition obtained from a feedstock fermented in the absence of a microorganism expressing an enzyme to mitigate mycotoxin contamination or a cell lysate comprising a microorganism expressing an enzyme to mitigate mycotoxin contamination.

2. A livestock feed composition comprising distiller's grain sourced from post-fermentation stillage, wet cake, and/or syrup stream treated with an enzyme to mitigate mycotoxin contamination, wherein the levels of mycotoxin in the livestock feed composition are decreased relative to the levels of mycotoxin in a livestock feed composition obtained from untreated post-fermentation stillage, wet cake, and/or syrup stream, and wherein the enzyme is obtained by inoculating post-fermentation stillage, wet cake, and/or syrup stream with a microorganism expressing an enzyme to mitigate mycotoxin contamination or by adding to the post-fermentation stillage, wet cake, and/or syrup stream a cell lysate comprising a microorganism expressing an enzyme to mitigate mycotoxin contamination.

3. A livestock feed composition comprising distiller's grain sourced from beer treated with an enzyme to mitigate mycotoxin contamination, wherein the levels of mycotoxin in the livestock feed composition are decreased relative to the levels of mycotoxin in a livestock feed composition obtained from untreated beer, and wherein the enzyme is obtained by inoculating beer with a microorganism expressing an enzyme to mitigate mycotoxin contamination or by adding to the beer a cell lysate comprising a microorganism expressing an enzyme to mitigate mycotoxin contamination.

4. The livestock feed composition of any one of examples 1-3, wherein the mycotoxin is selected from the group consisting of aflatoxin, Ochratoxin A, patulin, T-2, HT-2, beauvericin, neosolaniol, nivalenol, deoxynivalenol, 3-ADON, trichothecene, ochratoxin, and zearalenone.

5. The livestock feed composition of any one of examples 1-3, wherein the enzyme is selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, xylanase, DepA/DepB, lactono hydrolase, Zearalenone hydrolase, and 2cys-peroxiredoxin.

6. The livestock feed composition of example 1, wherein the microorganism is a yeast.

7. The livestock feed composition of example 6, wherein the yeast is *S. cerevisiae*.

8. The livestock feed composition of example 6, wherein the yeast is *Pichia pastoris*.

9. The livestock feed composition of claim 6, wherein the yeast is a non-genetically modified commodity yeast or a consolidated bioprocessing yeast.

10. The livestock feed of any one of example 1-3, wherein the enzyme is expressed by a yeast host cell.

11. The livestock feed composition of any one of examples 1-10, wherein the levels of mycotoxin are less than about 10 ppm.

12. The livestock feed composition of any one of examples 1-10, wherein the levels of mycotoxin are less than about 5 ppm.

13. The livestock feed composition of any one of examples 1-10, wherein the levels of mycotoxin are less than about 2 ppm.

14. A method of fermentation comprising inoculating a feedstock with one or more yeast strains, wherein at least one yeast strain expresses one or more mycotoxin mitigating enzymes.

15. The method of example 14, further comprising fermenting the feedstock to produce ethanol and distiller's grain.

16. The method of example 14, wherein the mycotoxin mitigating enzyme is deoxynivalenol hydroxylase.

17. The method of example 16, wherein the feedstock is contaminated with deoxynivalenol.

18. The method of example 15, wherein the levels of deoxynivalenol in the distiller's grain are decreased relative to the levels of deoxynivalenol in distiller's grain obtained from a feedstock fermented in the absence of a yeast expressing deoxynivalenol hydroxylase.

19. A method of mitigating mycotoxin contamination in livestock feed, the method comprising fermenting a feedstock in the presence of a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin.

20. A method of mitigating mycotoxin contamination in livestock feed, the method comprising contacting post-fermentation stillage, wet cake, and/or syrup stream with an enzyme to mitigate mycotoxin contamination, wherein the levels of mycotoxin in the livestock feed composition are decreased relative to the levels of mycotoxin in a livestock feed composition obtained from untreated post-fermentation stillage, wet cake, and/or syrup stream, wherein the enzyme is obtained by inoculating post-fermentation stillage, wet cake, and/or syrup stream with a microorganism expressing an enzyme to mitigate mycotoxin contamination or by adding to the post-fermentation stillage, wet cake, and/or syrup stream a cell lysate comprising a microorganism expressing an enzyme to mitigate mycotoxin contamination.

21. A method of mitigating mycotoxin contamination in livestock feed, the method comprising contacting beer with an enzyme to mitigate mycotoxin contamination, wherein the levels of mycotoxin in the livestock feed composition are decreased relative to the levels of mycotoxin in a livestock feed composition obtained from untreated pre-distillation whole stillage, and wherein the enzyme is obtained by inoculating beer with a microorganism expressing an enzyme to mitigate mycotoxin contamination or by adding to the beer a cell lysate comprising a microorganism expressing an enzyme to mitigate mycotoxin contamination.

22. The method of example 21, wherein the step of contacting beer with an enzyme comprises lysing yeast expressing the enzyme and adding the lysate to the beer.

23. A vector comprising a nucleic acid sequence of SEQ ID NO: 1, or a nucleic acid having at least about 95% sequence identity to SEQ ID NO: 1, encoding deoxynivalenol hydroxylase (Ddna).

24. The vector of example 23, further comprising one or more nucleic acid sequences encoding a KdR gene, KdX gene, or Ddna gene.

25. The vector of example 23, selected from the group consisting of pYEDP60 (*S. cerevisiae*), pPINK (*P. pastoris*), or pCWori (bacterial) or other custom vector for integration into yeast genome.

26. A microorganism expressing a vector of example 23.

27. The microorganism of example 26 selected from a yeast and a bacteria.

28. The microorganism of example 26, wherein the yeast is *S. cerevisiae*.

29. The microorganism of example 26, wherein the yeast is *Pichia pastoris*.

30. The microorganism of example 26, wherein the bacteria is *E. coli, lactobacillus,* or *zymomonas*.

31. The microorganism of example 26, wherein the yeast is a non-genetically modified commodity yeast or a consolidated bioprocessing yeast.

32. A vector comprising a nucleic acid sequence of SEQ ID NO: 10, or a nucleic acid having at least about 95% sequence identity to SEQ ID NO: 10.

33. A microorganism expressing a vector of claim 32.

34. The microorganism of example 33 selected from a yeast and a bacteria.

35. The microorganism of example 33, wherein the yeast is *S. cerevisiae*.

36. The microorganism of example 33, wherein the yeast is *Pichia pastoris*.

37. The microorganism of example 33, wherein the bacteria is *E. coli, lactobacillus,* or *zymomonas*.

38. The microorganism of example 33, wherein the yeast is a non-genetically modified commodity yeast or a consolidated bioprocessing yeast.

39. Use of microorganism comprising a vector of any one of examples 23 to 26 in expressing deoxynivalenol hydroxylase during fermentation, in beer, and/or in distiller's grain sourced from post-fermentation stillage, wherein fermentation feedstock is contaminated with deoxynivalenol.

40. A method for expressing a mycotoxin modulating enzyme in a yeast host cell comprising: transforming the host cell with an integration vector comprising a nucleic acid having one or more expression cassettes comprising a nucleic acid encoding a mycotoxin modulating enzyme, and a targeting nucleic acid that directs insertion of the integration vector into a particular location of the genome of the host cell by homologous recombination, wherein the transformed host cell produces the mycotoxin modulating enzyme.

41. A microorganism expressing deoxynivalenol dehydroxylase, wherein the microorganism is *Pichia pastoris* or *S. cerevisiae.*

42. A method of mitigating mycotoxin contamination in a feed or food product produced in a dry mill or wet mill grain processing facility, the method comprising: contacting a feedstock or process stream of a dry mill or wet mill grain processing facility with an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin; and producing a food or feed product from a process stream downstream of said contacting step.

43. The method of example 42, wherein contacting comprises contacting whole grain, cracked grain, steeped grain, steep water, steep liquor, flour, slurry, beer, whole stillage, wet cake, thin stillage, concentrated thin stillage, defatted concentrated thin stillage (e.g. syrup), germ, oil, fiber, protein, starch, or combinations thereof.

44. The method of example 42, wherein contacting comprises contacting the feed stock or process stream with a microorganism expressing an enzyme selected from the group consisting of aflatoxin oxidase, 3-O acetyltransferase, peroxidase, F420H2-dependent reductases, Ery4, UDP-glycosyltransferase, laccase, manganese peroxidase, deoxynivalenol hydroxylase, lactono hydrolase, Zearalenone hydrolase, xylanase, DepA/DepB, and 2cys-peroxiredoxin, a broth containing a such a microorganism, a lysate formed by lysing a such a microorganism, a concentrate of such a microorganism or lysate, or combinations thereof.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

SEQUENCE LISTING

DdnA DNA SEQ ID NO: 1
kdX Protein Modified DNA Sequence SEQ ID NO: 2
kdR Protein Modified DNA Sequence SEQ ID NO: 3
pUC57 Cloning Vector SEQ ID NO: 4
pPink-HC (High Copy *P. pastoris* vector) SEQ ID NO: 5
pPink-LC (Low Copy Vector for *P. pastoris*) SEQ ID NO: 6
pPink-aHC (High Copy *P. pastoris* Vector) SEQ ID NO: 7
pJKW1148 (same backbone as the pYEDP60 plasmid) SEQ ID NO: 8
pCWori SEQ ID NO: 9
Single Expression Cassette of Ddna, Kdx, Kdr expression SEQ ID NO: 10

What is claimed is:

1. A method of mitigating deoxyniyalenol contamination in a food or feed product produced as a byproduct of fermentation in a dry mill or wet mill grain processing facility, the method comprising:
inoculating a feedstock comprising ground corn with an ethanologen to produce ethanol and disiller's grain;
contacting the feedstock or a fermentation process stream with deoxynivalenol hydroxylase, and
producing a food or feed product from the process stream downstream of said contacting step,
wherein the level of deoxynivalenol in the food or feed product is lower than the level of deoxynivalenol in the feedstock or process stream prior to exposure to the deoxynivalenol hydroxylase.

2. The method of claim 1, wherein the feedstock or process stream is selected from the group consisting of whole corn, cracked corn, steeped corn, steep water, steep liquor, flour, slurry, beer, whole stillage, wet cake, thin stillage, concentrated thin stillage, defatted concentrated thin stillage, germ, oil, fiber, protein, starch, and combinations thereof.

3. The method of claim 1, wherein the step of contacting comprises contacting the feedstock or process stream with a microorganism expressing deoxynivalenol hydroxylase, a broth containing such a microorganism, a lysate formed by lysing such a microorganism, a concentrate of such a microorganism or lysate, or combinations thereof.

4. The method of claim 3, wherein the microorganism is an ethanologen.

5. The method of claim 3, wherein the microorganism is selected from the group consisting of a yeast and a bacterium.

6. The method of claim 5, wherein the microorganism is a yeast selected from the group consisting of *S. cerevisiae* and *Pichia pastoris*.

7. The method of claim 5, wherein the microorganism is a bacterium selected from the group consisting of *E. coli, Lactobacillus,* and *Zymomonas*.

8. The method of claim 3, wherein the method further comprises contacting the feedstock or process stream with a microorganism expressing KdR and/or KdX, a broth containing such a microorganism, a lysate formed by lysing such a microorganism, a concentrate of such a microorganism or lysate, or combinations thereof.

9. The method of claim 8, wherein the gene encoding KdR, the gene encoding KdX and the gene encoding deoxynivalenol hydroxylase are provided on an expression cassette comprising a polynucleotide comprising a nucleotide sequence set forth in SEQ ID NO: 10, or a polynucleotide comprising a nucleotide sequence having at least about 95% sequence identity to SEQ ID NO: 10.

10. The method of claim 8, wherein the deoxynivalenol hydroxylase is expressed in a first microorganism and the KdR and/or KdX are expressed in a second microorganism.

11. The method of claim 8, wherein the deoxynivalenol hydroxylase and the KdR and/or KdX are expressed in the same microorganism.

12. The method of claim 1, wherein the level of mycotoxin in the food or feed product is less than about 20 ppm.

13. The method of claim 1, wherein the level of mycotoxin in the food or feed product is less than about 10 ppm.

14. The method of claim 1, wherein the level of mycotoxin in the food or feed product is less than about 5 ppm.

15. The method of claim 1, wherein the level of mycotoxin in the food or feed product is less than about 2 ppm.

* * * * *

UNITED STATES PATENT AND TRADEMARK OFFICE
CERTIFICATE OF CORRECTION

| | | |
|---|---|---|
| PATENT NO. | : 11,781,096 B2 | Page 1 of 1 |
| APPLICATION NO. | : 18/054641 | |
| DATED | : October 10, 2023 | |
| INVENTOR(S) | : Manning and Bly | |

It is certified that error appears in the above-identified patent and that said Letters Patent is hereby corrected as shown below:

In the Claims

Claim 1, Line 1 should read:
1. A method of mitigating deoxynivalenol contamination in a food or feed product produced as a byproduct of fermentation in a dry mill or wet mill grain processing facility, the method comprising: inoculating a feedstock comprising ground corn with an ethanologen to produce ethanol and distiller's grain;
contacting the feedstock or a fermentation process stream with deoxynivalenol hydroxylase, and producing a food or feed product from the process stream downstream of said contacting step, wherein the level of deoxynivalenol in the food or feed product is lower than the level of deoxynivalenol in the feedstock or process stream prior to exposure to the deoxynivalenol hydroxylase.

Signed and Sealed this
Twenty-seventh Day of February, 2024

*Katherine Kelly Vidal*

Katherine Kelly Vidal
*Director of the United States Patent and Trademark Office*